(12) United States Patent
Zuckermann et al.

(10) Patent No.: US 6,783,929 B1
(45) Date of Patent: Aug. 31, 2004

(54) BIOLOGICAL SAMPLE COMPONENT PURIFICATION AND DIFFERENTIAL DISPLAY

(75) Inventors: Ronald N. Zuckermann, El Cerrito, CA (US); Eric Beausoleil, San Francisco, CA (US); Matthew Wachowicz, San Francisco, CA (US); Srinivas Kothakota, Santa Monica, CA (US)

(73) Assignee: Chiron Corporation, Emeryville, CA (US)

( * ) Notice: Subject to any disclaimer, the term of this patent is extended or adjusted under 35 U.S.C. 154(b) by 47 days.

(21) Appl. No.: 09/704,422

(22) Filed: Nov. 1, 2000

Related U.S. Application Data

(60) Provisional application No. 60/169,160, filed on Dec. 6, 1999, and provisional application No. 60/163,110, filed on Nov. 2, 1999.

(51) Int. Cl.[7] .................. G01N 33/53; G01N 33/543
(52) U.S. Cl. .............................. 435/4; 435/7.1; 435/7.9; 435/7.92; 435/814; 436/164; 436/177; 436/518; 436/524; 436/528; 210/600; 210/634; 210/644; 210/645; 210/649; 210/650; 210/651; 210/656
(58) Field of Search .............................. 435/4, 7.1, 7.9, 435/7.92, 814, 6; 436/518, 524, 528, 164, 177; 210/600, 634, 644, 645, 649–651, 656, 660

(56) References Cited

U.S. PATENT DOCUMENTS

| | | |
|---|---|---|
| 4,963,263 A | 10/1990 | Kauvar |
| 5,133,866 A | 7/1992 | Kauvar |
| 5,340,474 A | 8/1994 | Kauvar |
| 5,409,611 A | 4/1995 | Kauvar |
| 5,556,942 A | 9/1996 | Kauvar et al. |
| 5,567,317 A | 10/1996 | Kauvar |

(List continued on next page.)

FOREIGN PATENT DOCUMENTS

| | | | |
|---|---|---|---|
| EP | 1 006 362 A1 | 7/2000 | |
| WO | WO 89/09088 | 10/1989 | |
| WO | WO 91/06356 | 5/1991 | |
| WO | WO 98/42730 | 10/1998 | |
| WO | WO 00/11208 | 3/2000 | ............ C12Q/1/00 |

OTHER PUBLICATIONS

Hruby, et al., "Synthesis of oligopeptide and peptidomimetic libraries", Department of Chemistry, University of Arizona, Current Opinion in Chemical Biology, 1997, 1:114–119.

Ripka, et al., "Peptidomimetic design", Department of Chemistry and School of Pharmacy, University of Wisconsin–Madison, Current Opinion in Chemical Biology, 1998, 2:441–452.

(List continued on next page.)

Primary Examiner—Long Le
Assistant Examiner—Kartic Padmanabhan
(74) Attorney, Agent, or Firm—James E. Austin; Steven W. Collier; Robert P. Blackburn

(57) ABSTRACT

Provided are affinity support materials having intermediate binding affinity for biological samples. Among the materials provided by the present invention are hydrophilic solid supports composed of hydrophilic ligands coupled to hydrophilic matrixes which are compatible with biological samples, for example, a cell line, a biological fluid such as blood, or a tissue cell lysate. The ligands may include affinity property groups and hydrophilic groups pendent from a backbone, and be configured to at least partially resolve components of a biological sample. Affinity supports in accordance with the present invention may be used in a variety of techniques and apparatuses to achieve improved separations of complex biological samples and thereby enhance the results of biological sample component fractionations, enrichments, purifications, expression product determinations and comparisons, and other biological sample processing techniques. In addition, the affinity supports may be included in kits useful in processing biological samples.

27 Claims, 14 Drawing Sheets

U.S. PATENT DOCUMENTS

| | | | |
|---|---|---|---|
| 5,599,903 | A | 2/1997 | Kauvar et al. |
| 5,763,570 | A | 6/1998 | Kauvar et al. |
| 5,767,086 | A | 6/1998 | Kauvar et al. |
| 5,786,336 | A | 7/1998 | Kauvar et al. |
| 5,831,005 | A | 11/1998 | Zuckerman et al. ........ 530/333 |
| 5,955,432 | A | 9/1999 | Kauvar et al. |
| 6,013,462 | A | 1/2000 | Kauvar et al. |
| 6,225,047 | B1 * | 5/2001 | Hutchens et al. .............. 435/5 |

OTHER PUBLICATIONS

Al–Obeidi, et al., "Peptide and Peptidomimetic Libraries", Molecular Diversity and Drug Design, Molecular Biotechnology, 1998, vol. 9, pp. 205–223.

Berry, et al., "Use of Antibody Fragments in Immunoaffinity Chromatography"" Comparison of FV Fragments, VH Fragments and Paralog Peptides, Journal of Chromatography, Chrom. 23 869, 1992, pp. 239–245.

Chapman, et al., "Surveying for Surfaces that Resist the Absorption of Proteins", Department of Chemistry and Chemical Biology, Harvard University, Received Mar. 3, 2000, pp. 8303–8304.

Houry, et al., "Identification of in Vivo Substrates of the Chaperonin GroEL", Department of Cellular Biochemistry, Nature vol. 402, Nov. 11, 1999, pp. 147–154.

Martzen, et al., "A Biochemical Genomics Approach for Identifying Genes by the Activity of Their Products", Reports, vol. 286, Nov. 5, 1999, pp. 1153–1155.

Rajur, et al., "Combinatorial Synthesis of N–Substituted α–Amino Acids on Sepharose" Lecture Programme and Abstract Book, Solid Phase Synthesis & Combinatorial Chemical Libraries, The European Peptide Society & BS/RSC Protein and Peptide Science Group, UK, Dates: Aug. 31–SEp. 4, 1999, Abstract.

"The Promise of Proteomics", Nature, Macmillian Magazines Ltd, Dec. 16, 1999, vol. 402, Issue No. 402, p. 703.

* cited by examiner

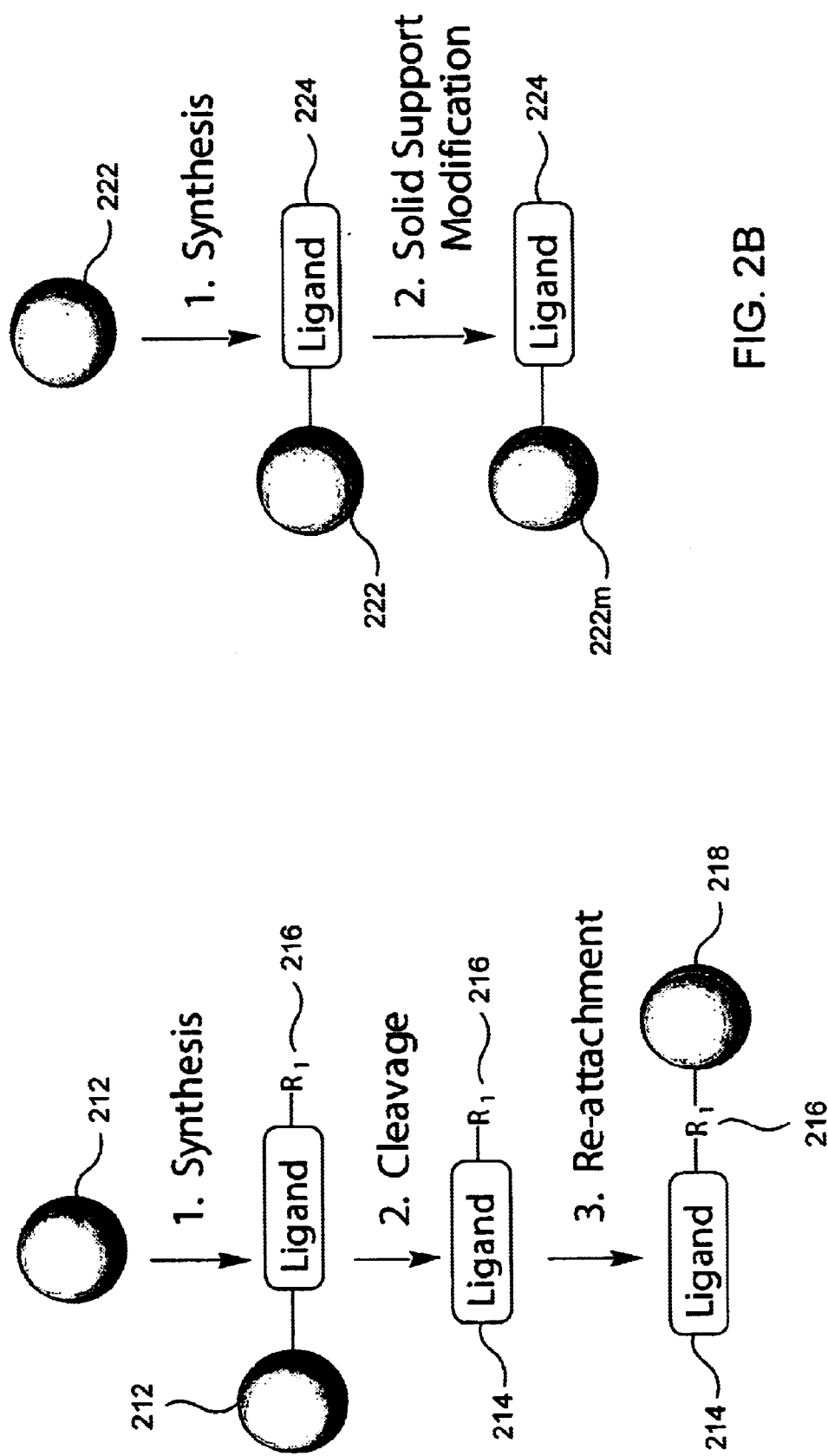

CATIONIC RESINS

Whole Cell Lysate
100%
8224    8225
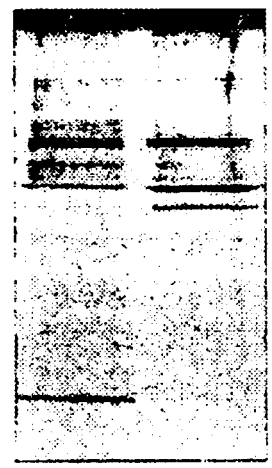
7%    11%
FIG. 8

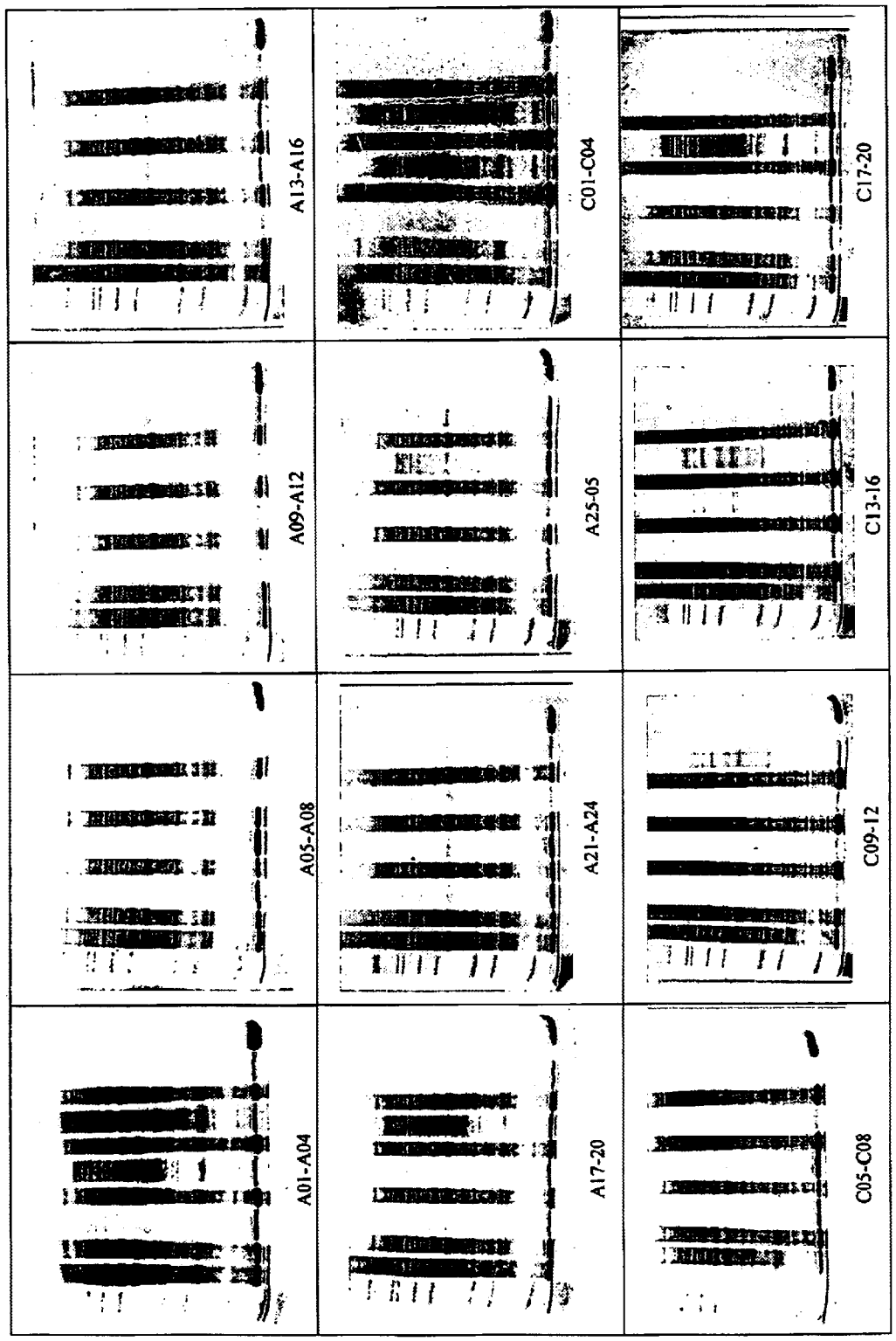
FIG. 11 (1)

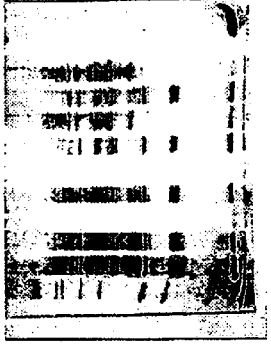
FIG. 11 (2)

BIOLOGICAL SAMPLE COMPONENT PURIFICATION AND DIFFERENTIAL DISPLAY

CROSS-REFERENCE TO RELATED APPLICATIONS

This application claims priority from U.S. Provisional Application No. 60/163,110, entitled CELL PRODUCT PURIFICATION AND DIFFERENTIAL DISPLAY, filed Nov. 2, 1999; and claims priority from U.S. Provisional Application No. 60/169,160, entitled CELL PRODUCT PURIFICATION AND DIFFERENTIAL DISPLAY, filed Dec. 6, 1999, the disclosures of which are herein incorporated by reference herein for all purposes.

BACKGROUND OF THE INVENTION

The present invention relates to techniques and materials for the purification of biological samples and the differential display and analysis of components of such biological samples. In one embodiment, the invention is directed to protein purification and proteome differential display.

Current methodologies for purifying biological sample components (e.g., protein, nucleic acid, etc.) rely on a few commercially available hydrophilic solid supports. Conventional chromatography supports include anionic exchange supports, such as diethylaminoethyl (DEAE) Sepharose, etc., cationic exchange supports, for example having carboxymethyl functional groups, reverse phase and hydrophobic interaction supports. These materials are able to distinguish between biological sample components, such as proteins, only very generally and are therefore limited in their ability to separate biological sample components, particularly proteins of similar anionic, cationic, etc. character.

Other currently available separation techniques are very specific. For example, affinity chromatography supports based on antibodies, proteins, sugars, etc., are available, such as described by *Use of antibody fragments in immunoaffinity chromatography: comparison of FV fragments, VH fragments and paralog peptides*. Berry, M. J.; Davies, J. J. Chromatogr. (1992), 597(1–2), 239–45. However, just as the conventional chromatography supports are too general to provide more than limited separation of the complex mixtures of chemicals that typically comprise biological samples, conventional affinity supports are too specific to provide useful separation of the many components of such mixtures beyond a specific corresponding target or antigen.

Thus, neither of these currently available separation alternatives is particularly effective in the separation of complex mixtures of biological sample components typically found in biological cell and tissue samples. The current development of new affinity chromatography materials is based on the screening of peptide-, protein- or small molecule-resin complexes. However, these approaches have limitations in terms of diversity, biological/chemical stability and large-scale production.

Another potential approach to the separation of biological sample components is through the use of electrophoresis, particularly two-dimensional gel electrophoresis. Two-dimensional gels may be run for biological samples, such as cell lysates or tissue samples, separating on the basis of pH in one dimension and on the basis of molecular weight in the other. However, this technique has severe specificity limitations due to the fact that very abundant proteins in the mixture often obscure less abundant proteins. In addition, this technique has low throughput and is not amenable to large scale production.

In addition to separating and purifying biological sample components from complex biological samples, it is also useful to characterize the sample components. A comparison of the components of two biological samples having different phenotypes may allow for the identification of the source(s) of the difference between the samples. For example, by conducting such a differential analysis of a healthy tissue sample and a diseased tissue sample of the same type, it may be possible to identify the cause of the disease and/or characterize the phenotypic symptoms of the disease. This approach has received significant attention at the genetic (nucleic acid) level, and has seen the development of the field of "genomics."

One particular application of this genomics approach is described in M. R. Martzen et al. *A Biochemical Genomics Approach for Identifying Genes by the Activity of Their Products*, Science, Vol. 286, Nov. 5, 1999, incorporated by reference herein. However, this approach may not lend itself to diagnostic and drug development applications.

This approach has received less attention at the gene product (protein) level. However, more recently the field of "proteomics" has begun to develop. The proteomics approach to analyzing differential gene expression is attractive. While there may be correlation between genetic differences in different biological samples and the different phenotypes observed in their associated cells, tissues, or organisms (e.g., healthy vs. diseased states), genomic differences are not do not necessarily manifest themselves as differences in gene expression. Proteomics, on the other hand, directly addresses differences in gene expression by focussing the analysis on the protein constituents of the sample under study. The effectiveness of proteomic approaches, however, are limited by the ability of currently available materials and techniques to provide high resolution differential displays of biological samples under study. For example, Kauvar et al. (e.g., U.S. Pat. No. 5,599,903, Preparation of glutathione analogs and paralog panels comprising glutathione mimics as affinity ligands and glutathione transferase inhibitors; International Patent Application No. WO 9106356, Methods and kits to identify analyte-binding ligands using paralog panels; International Patent Application No. WO 8909088, Paralog substrates for affinity chromatography, their selection, and their use; and *Paralog chromatography*. Kauvar, Lawrence M. et al. BioTechniques (1990), 8(2), 204-9; ) have described the use of peptides mounted on chromatography supports for use in separating protein mixtures. These peptide-based separation materials are, however, subject to proteolytic degradation and are therefore of limited utility.

Accordingly, the development of techniques and materials that facilitate the improved separation of biological sample component mixtures as well as enhance the effectiveness of proteomic analysis would be desirable.

SUMMARY OF THE INVENTION

To achieve the foregoing, the present invention provides affinity support materials having intermediate binding affinity for biological samples, relative to conventional materials having only very general or very specific binding affinities. Among the materials provided by the present invention are hydrophilic solid supports composed of hydrophilic ligands coupled to hydrophilic matrixes which are compatible with biological samples. Suitable biological samples applicable to the present invention may be of virtually any type or source including for example, cells derived from defined cell lines (e.g., tumor cell lines, bacteria, virus-infected cells, replicons, and the like); biological fluids, such as blood, urine, saliva, or mucus; cells collected from biological surfaces such as from washes (e.g., lavages) or swabes (e.g., pap smears or throat cultures); and—cells derived from tissue samples (e.g., cells obtained from biopsies of diseased tissues and/or undiseased "normal" tissues). The biological samples can homogeneous (ie., from a single source) or heterogeneous (i.e., two or more unrelated sources). The ligands described herein may include affinity property groups and hydrophilic groups pendent from a backbone, and be configured to at least partially resolve components of a biological sample as defined above. Such affinity property groups and hydrophilic groups can be selected using methods described hereinbelow.

Affinity supports in accordance with the present invention may be used in a variety of techniques and apparatuses to achieve improved separations of complex biological samples and thereby enhance the results of biological sample component resolutions, fractionations, enrichments, purifications, expression product determinations and comparisons, and other biological sample processing and analysis techniques. In addition, the affinity supports may be included in kits useful in processing biological samples for applications such as novel protein purification.

In some embodiments of the present invention, the hydrophilic ligands of the affinity supports may be peptoids with both affinity property groups and hydrophilic groups pendent from their peptoid backbones. A variety of peptoid structures, as well as parameters for designing and fabricating peptoids having suitable properties and arrays of peptoids having suitable ranges of properties are also provided.

In one aspect, the present invention provides a method for providing a biological sample component expression pattern for a biological sample involving applying a biological sample to one or more ligands coupled to a biological sample-compatible matrix. The ligand may include a plurality of affinity property groups and hydrophilic groups pendent from a backbone, and configured to at least partially resolve biological sample components of a biological sample. The components of the sample may be fractionated using one or more hydrophilic ligands to provide an enriched fraction, and a biological sample component expression pattern for the biological sample may be determined using the enriched fraction.

In other embodiments, the invention provides, methods of comparing biological sample phenotypes, reducing complexity of biological samples, massively parallel processing a biological sample on a number of affinity supports both one- and two-dimensionally, and materials and kits incorporating affinity supports useful in accomplishing these methods. Also provided are methods of making affinity supports in accordance with the present invention, in particular supports including peptoids having both affinity property groups and hydrophilic groups pendent from their peptoid backbones and coupled to hydrophilic matrixes.

These and other features and advantages of the present invention will be presented in more detail in the following specification of the invention and the accompanying figures which illustrate by way of example the principles of the invention.

BRIEF DESCRIPTION OF THE DRAWINGS

FIGS. 2A and 2B schematically depict alternative processes for synthesizing a hydrophilic affinity chromatography support in accordance with the present invention.

FIG. 8 depicts electrophoretic gels illustrating the binding capacity of chromatography columns prepared using supports in accordance with the present invention.

FIG. 11 depicts electrophoretic gels illustrating the results of a parallel processing of a cell lysate in accordance with the present invention.

DETAILED DESCRIPTION OF EMBODIMENTS OF THE INVENTION

Figure 1:
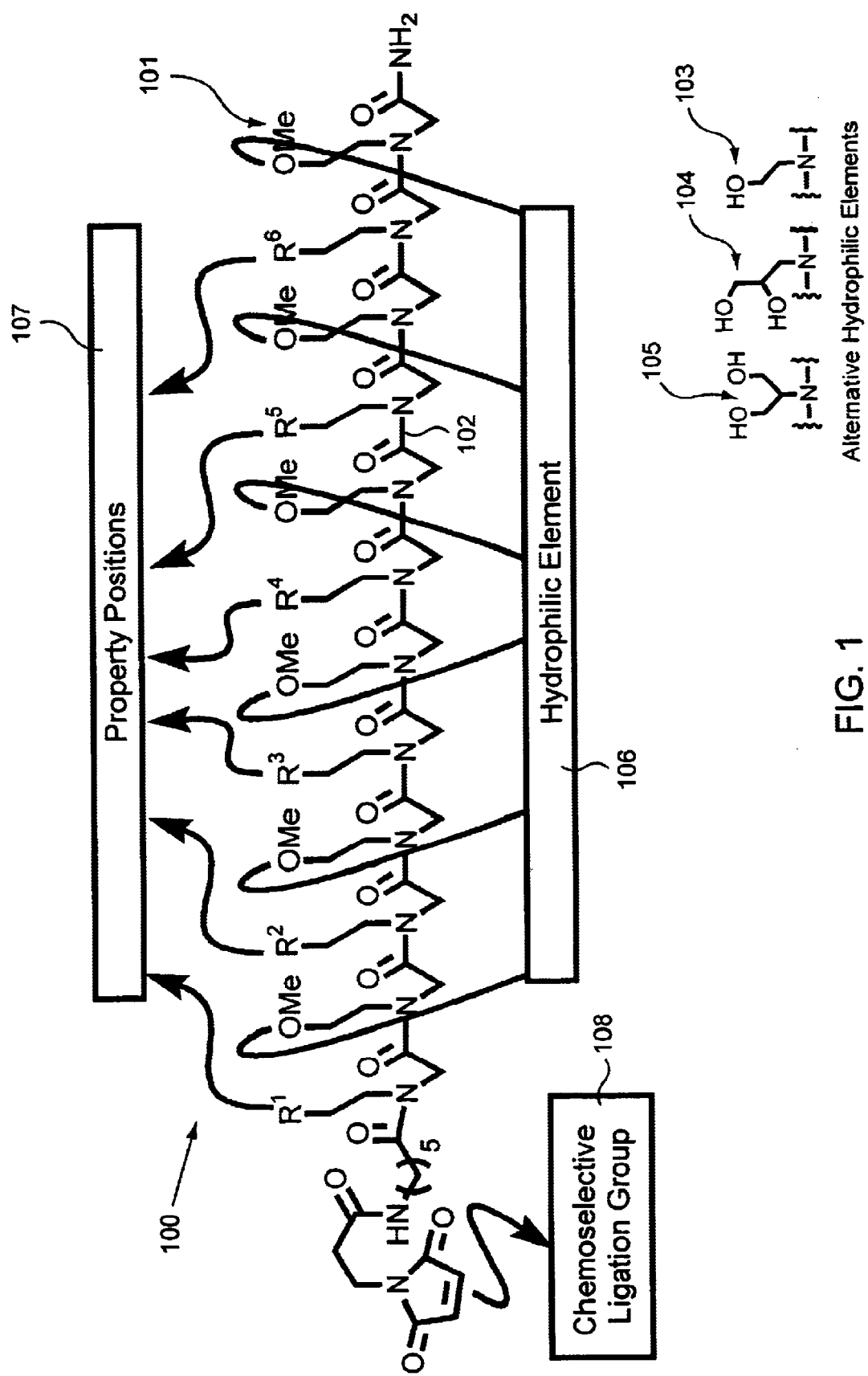
FIG. 1 schematically depicts the structure of a hydrophilic peptoid in accordance with one embodiment of the present invention.

The affinity support materials and associated techniques and apparatuses of the present invention will now be described with reference to several embodiments. Important properties and characteristics of the described embodiments are illustrated in the structures in the text and in the accompanying drawings. While the invention will be described in conjunction with these embodiments, it should be understood that the invention it is not intended to be limited to these embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

1. Introduction

The present invention provides affinity support materials having intermediate and controllable binding affinity for biological samples, relative to conventional materials. "Intermediate and controllable binding affinity support materials", as used herein, refers to materials capable of interacting with the constituents of a biological sample by a combination of ionic, van der Waal's, and hydrogen bond interactions akin to protein-protein, protein-oligonucleoside (oligonucleotide), or oligonucleoside (oligonucleotide)-oligonucleoside (oligonucleotide) interactions. Thus, those of skill in the protein and nucleotide chemistry arts will appreciate that the support materials of the present invention differ significantly from the materials taught by the prior art for separating the components of biological samples, as the materials taught by the prior art use only very general and uncontrollable interactions with biological sample components (e.g., charge-based) or very specific and controlled (e.g., antibody-based) binding affinities, but nothing intermediate these extremes. In general, the supports provided by the present invention combine the attributes of general resins typically based on one functional group (like anion or cation exchange resins) and highly specific affinity resins based on a particular combination of several functional groups chosen for a single, specific target constituent. The supports described herein will have many functional groups, but, on average, they may be less specifically defined than the highly specific arrays of the prior art. Therefore, the supports will still yield high affinities in many cases, but may have a broader specificity than an affinity resin.

Among the materials provided by the present invention are hydrophilic solid supports composed of hydrophilic ligands coupled to hydrophilic matrixes which are compatible with biological samples, for example, those derived from a cell line, blood or a tissue, or cell lysate. A biological sample-compatible hydrophilic matrix is a matrix that is effective to minimize substantially interactions between components of a biological sample and the matrix. Thus, compatible matrixes as described herein will be recognized by those having skill in the chemistry arts as being resistant to proteolytic degradation and providing a relatively low non-specific binding (also sometimes referred to as resistant to protein adsorption) by the components of the biological sample (for example proteins). The ligands may include affinity property groups and hydrophilic groups pendent from a backbone, and be configured to at least partially resolve components of a biological sample.

Affinity supports in accordance with the present invention may be used in a variety of techniques and apparatuses to achieve improved separations of complex biological samples and thereby enhance the results of biological sample component resolutions, fractionations, enrichments, purifications, expression product determinations and comparisons, and other biological sample processing techniques. In addition, the affinity supports may be included in kits useful in processing biological samples.

In order to expose biological sample components, such as proteins, to a solid phase linked ligand, the solid phase must posses a high hydrophilic character. Otherwise, non specific binding occurs and a low resolution is obtained. Therefore, the present invention provides ligand molecules which can be configured to display a wide variety of chemical functionalities or properties, suitable for incorporation into an affinity separation support having an intermediate binding affinity for biological samples within a hydrophilic context. This hydrophilic context is provided by intercalating hydrophilic property and affinity property groups along a molecular backbone. The function of the hydrophilic groups is to provide substantially aqueous solubility of the affinity ligand in the presence of a diversity of side chains that are often hydrophobic. The hydrophilic groups also prevent aggregation of the affinity ligand by preventing large hydrophobic patches. Aqueous solubility allows the efficient derivatization of hydrophilic solid support used in biological sample component, particularly protein, separations. Hydrophilic ligands so formed are then linked to hydrophilic solid phase substrates to form affinity supports.

While a suitable affinity support must posses a high hydrophilic character, the synthesis of ligands generally require an organic environment. Thus, as described in more detail below, the present invention provides a method of synthesizing a diversity of ligands by solid-phase organic synthesis in organic solvent and on hydrophobic resins such as polystyrene. The ligands are then cleaved and dissolved in aqueous buffer to facilitate their attachment to hydrophilic substrates, such as sepharose, suitable for application of biological samples. It is also possible, in accordance with the present invention, to synthesize ligands by solid-phase organic synthesis in organic solvent and on hydrophobic resins, and thereafter to convert the resin to a hydrophilic substrate, obviating the need to transfer the ligand from one substrate to another. Other methods are described in co-pending U.S. patent application Ser. No. 08/828,195, filed Mar. 21, 1997, and which is incorporated herein by reference in its entirety and for all purposes.

2. Peptoids

In some embodiments of the present invention, the hydrophilic ligands of the affinity supports may be "peptoids" with both affinity property groups and hydrophilic groups pendent from their backbones. Generally speaking, a "peptoid" is a poly (N-substituted glycine), sharing the backbone structure of a protein, but having pendant groups that differ in whole or in part from conventional amino acid groups. Peptoids are known in the art and have been described in various publications, including U.S. Pat. Nos. 5,877,278, 5,977,301, 5,831,005 and 5,811,387 each of which is incorporated by reference herein for all purposes. As noted above, ligands in accordance with the present invention may be conferred with a hydrophilic character by intercalating hydrophilic property and affinity property groups along the ligand's molecular backbone.

Hydrophilic peptoids in accordance with the present invention are particularly applicable to separation, purification and other processing of the protein component of biological samples. While the remainder of this disclosure focuses on the structure, synthesis and application of hydrophilic peptoids in relation to various protein processing techniques, it should be understood that the present invention is more generally applicable to the processing of biological sample components with intermediate affinity chromatography supports in accordance with the principles provided herein. Thus, the invention is intended to cover hydrophilic ligand molecules other than peptoids coupled to biological sample-compatible matrixes and their use for processing biological sample components beyond just proteins, and including nucleic acids, lipids, etc.

Peptoids are particularly good candidates for chromatography support materials. They are amenable to combinatorial synthesis, and with hundreds of diverse sidechains available it is possible to finely tailor support properties. Peptoids are protease stable, and can thus be used with crude cell lysates, for example, without risk of significant degradation by proteases typically present in such samples. They are chemically and thermally stable, allowing for the regeneration and reuse of supports. In addition, peptoids have relatively simple immobilization chemistry which is easily scaled-up for large scale production.

FIG. 1 schematically depicts a hydrophilic peptoid 100 in accordance with one embodiment of the present invention. In the depicted embodiment, the methoxyethyl side chain 101 is used as the hydrophilic element 106. This side chain is desirable because it is inexpensive and requires no protection. Alternatively, hydroxyl monomers, such as hydroxyethylamine 103, 1-hydroxyethyl-2-hydroxyethylamine 104 and the 2,3-dihydroxypropylamine 105, among many others may be used. In the embodiment depicted in FIG. 1, the hydrophilic element 106 is intercalated between each property (affinity) element 107, however, this is not necessarily the case and the hydrophilic and affinity groups may be distributed on the backbone 102 in any configuration that achieves the function of ensuring aqueous solubility of the ligand.

Of course, the number of hydrophilic groups in a particular peptoid will depend upon the hydrophilic/phobic character of the affinity groups included in that peptoid. It should also be noted that the placement of the hydrophilic and hydrophobic affinity groups should be such that highly amphipathic peptoid structures are avoided. Such structures may aggregate to form micelles thus detracting from their ability to achieve separations and/or couple efficiently with the substrate. During synthesis, the peptoid ligand 100 is typically attached to a hydrophobic substrate (not shown) in order to facilitate organic synthetic reactions. The ligand 100 may also have a chemoselective ligation group 108, such as maleimidopropionyl, attached to its free N-terminus to enable subsequent attachment to a hydrophilic support. Once the organic synthesis is complete, the peptoid ligand 100 may be cleaved from the hydrophobic resin and dissolved in aqueous buffer, to facilitate its attachment to a hydrophilic support suitable for application of aqueous biological samples, such as sepharose.

As noted above, the peptoid ligand may have a suitable chemoselective terminal group, for example, a maleimide such as maleimidopropionyl, which can form a covalent bond upon reaction with a thiol presented on the surface of a hydrophilic support. Other possible terminal groups on the ligand include hydrazide, which can react to form covalent bonds with aldehyde or ketone moieties on the support; aminooxy, which can react to form covalent bonds with aldehyde or ketone (or synthetically equivalent) moieties on the support; aldehyde which can react to form covalent bonds with hydrazides or aminooxy groups; disulfides which can react to form covalent bonds with thiol groups; thiols which can react to form covalent bonds with disulfide or maleimide groups, azide, phosphine, or avidin which can react to form a stable non-covalent bonding complex with biotin moieties on the support. Of course, other suitable binding combinations of this character (namely those combinations sufficiently stable to maintain the bond during the processing to which the support-bound peptoid ligand is subjected under its normal operating conditions) are also possible. In addition, those having skill in the surface chemistry arts will understand that the above-listed terminal groups on the peptoid ligand can function as reactive groups on the surface, and the reactive surface groups can also function as terminal peptoid ligand groups.

Alternatively, as noted above, the hydrophobic substrate may be converted to a hydrophilic substrate obviating the need to transfer the peptoid from one substrate to another. For example, the substrate can include various removable hydrophobic moieties. In one embodiment, a hydrophobic substrate is formed using hydroxyalkylacrylarnides protected with alkylsilylethers (e.g., tert-butyldimethylsilane (TBDMS))that can be removed using standard conditions to provide a hydrophilic substrate.

FIGS. 2A and 2B depict two processes for producing affinity supports composed of hydrophilic ligands on hydrophilic substrates. In the process of FIG. 2A 210, a ligand 214, which may be a peptoid as described above or another suitable molecule, is synthesized on a hydrophobic substrate 212, e.g., polystyrene. A chemoselective ligation group ($R_1$) 216 is attached to the free N-terminus of the hydrophobic substrate-bound ligand 214. The C-terminus or any suitable side-chain can also serve as a point of attachment for the chemoselective ligation group. Following completion of the organic synthesis, the ligand 214 is cleaved from the hydrophobic substrate 212 and reattached to a hydrophilic substrate 218, e.g., thiosepharose, via the chemoselective ligation group 216. Of course, the hydrophobic and hydrophilic substrates may be composed of a variety of materials as will be apparent to those of skill in the art.

Alternatively, according to the process of FIG. 2B 220, a ligand 224 is synthesized on a hydrophobic substrate 222, as in the first process 210 but absent a chemoselective ligation group. Following completion of the organic synthesis, the hydrophobic substrate 222 is modified to convert it into a hydrophilic substrate 222m. For example, the substrate may have been made hydrophobic by the presence of protecting groups on available hydroxyl moieties (e.g., —$OSiR_3$).In that case, the substrate can be converted to a hydrophilic state by removal of the protecting groups to provide free hydroxyl (—OH) groups following completion of the organic synthesis. In this alternative process, no cleavage and reattachment is required.

As noted above, peptoids are particularly good candidates for chromatography support materials, in part because it is possible to finely tailor support properties by selecting from among the hundreds of diverse sidechains available during the synthesis process. Thus, peptoids may be used in order to mimic some of the principal chemical functionalities found in proteins. In order to determine the best peptoid for conducting a particular separation, it is desirable to have an array of peptoids having a range of affinities. A biological sample, for example a cell lysate, may then be run in parallel on the array of peptoids and the separation results compared. The peptoid or peptoids with the best performance may then be selected for use in the actual separation.

One technique for building an array of peptoids possessing a range of affinities is to identify sidechains having physicochemical properties representative of one or more affinity properties commonly found in proteins, and then to combine those sidechains in various permutations in combination with hydrophilic side chains. In one such approach in accordance with the present invention, five different sidechains representing five different physicochemical properties (cationic, anionic, polar, aliphatic, and aromatic) were incorporated into an array of twenty-five 12 mer peptoids. The five sidechains selected for this approach are depicted below:

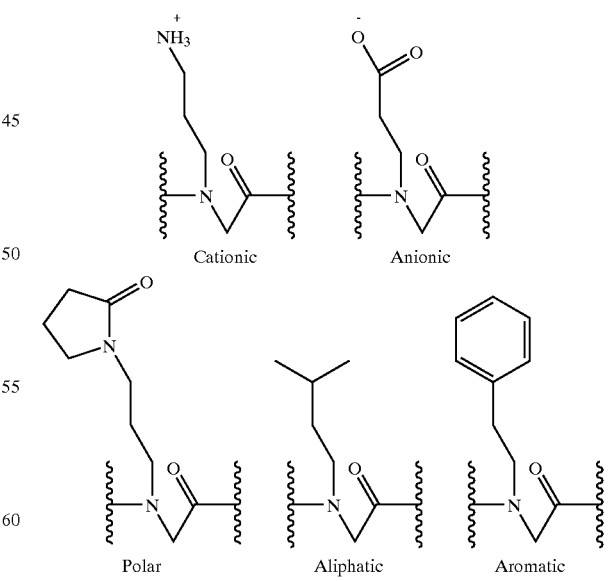

Other suitable sidechains will be apparent to those having skill in the organic chemistry and biochemistry arts.

The twenty-five 12 mers were constructed according to the matrices shown in Tables 1A and B, below:

TABLE 1A

| | Single Property Resins | | |
|---|---|---|---|
| | Low | Medium | High |
| Cationic | ✓ | ✓ | ✓ |
| Anionic | ✓ | ✓ | ✓ |
| Polar | ✓ | ✓ | ✓ |
| Aliphatic | ✓ | ✓ | ✓ |
| Aromatic | ✓ | ✓ | ✓ |

TABLE 1B

| | All Pairwise Property Combination Resins | | | | |
|---|---|---|---|---|---|
| | Cationic | Anionic | Polar | Aliphatic | Aromatic |
| Cationic | | ✓ | ✓ | ✓ | ✓ |
| Anionic | | | ✓ | ✓ | ✓ |
| Polar | | | | ✓ | ✓ |
| Aliphatic | | | | | ✓ |
| Aromatic | | | | | |

Figure 3A:
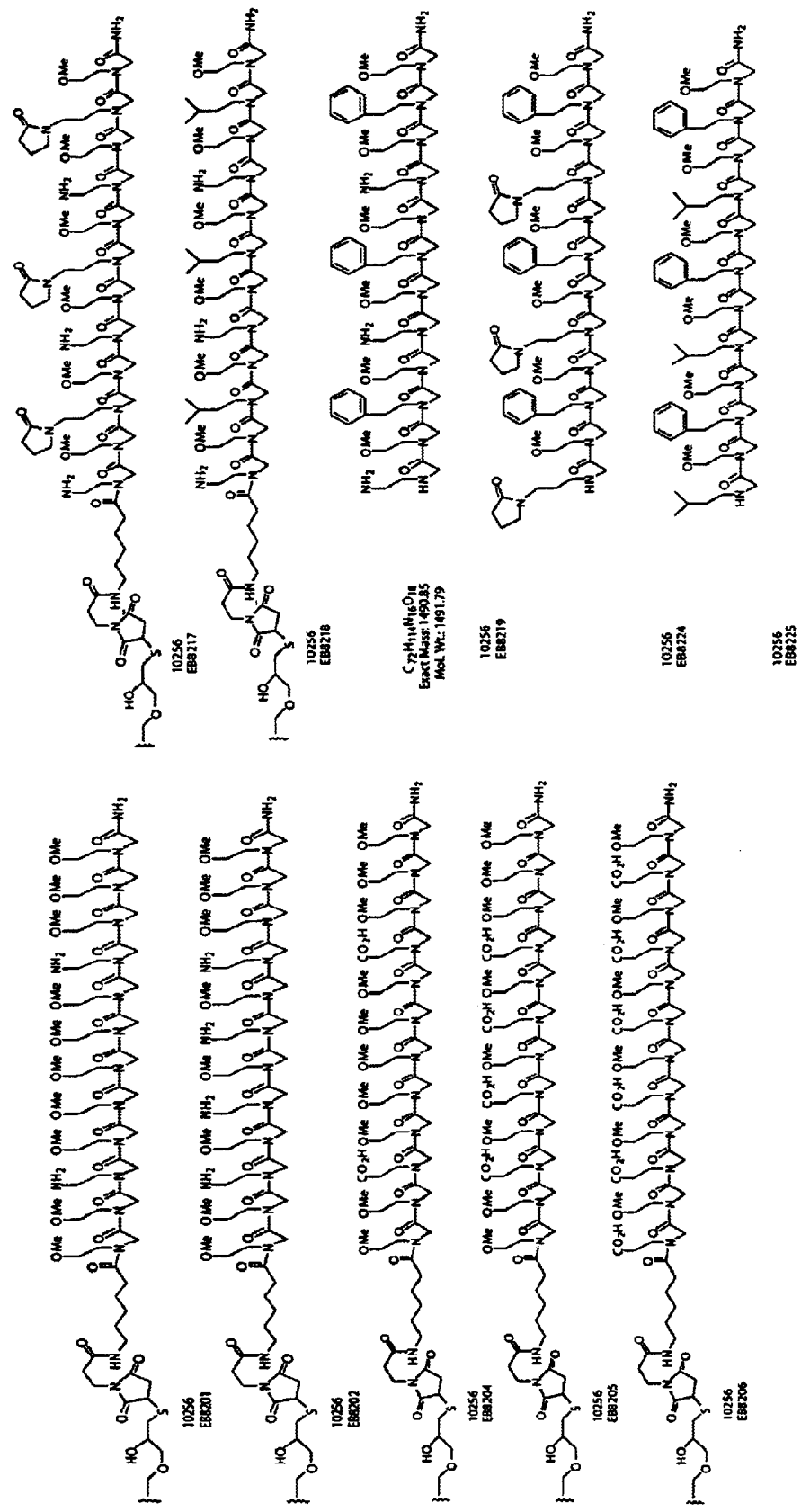
FIGS. 3A–C schematically depict the molecular structures of an array of 25 12 mer peptoids in accordance with one embodiment of the present invention.
Figure 3B:
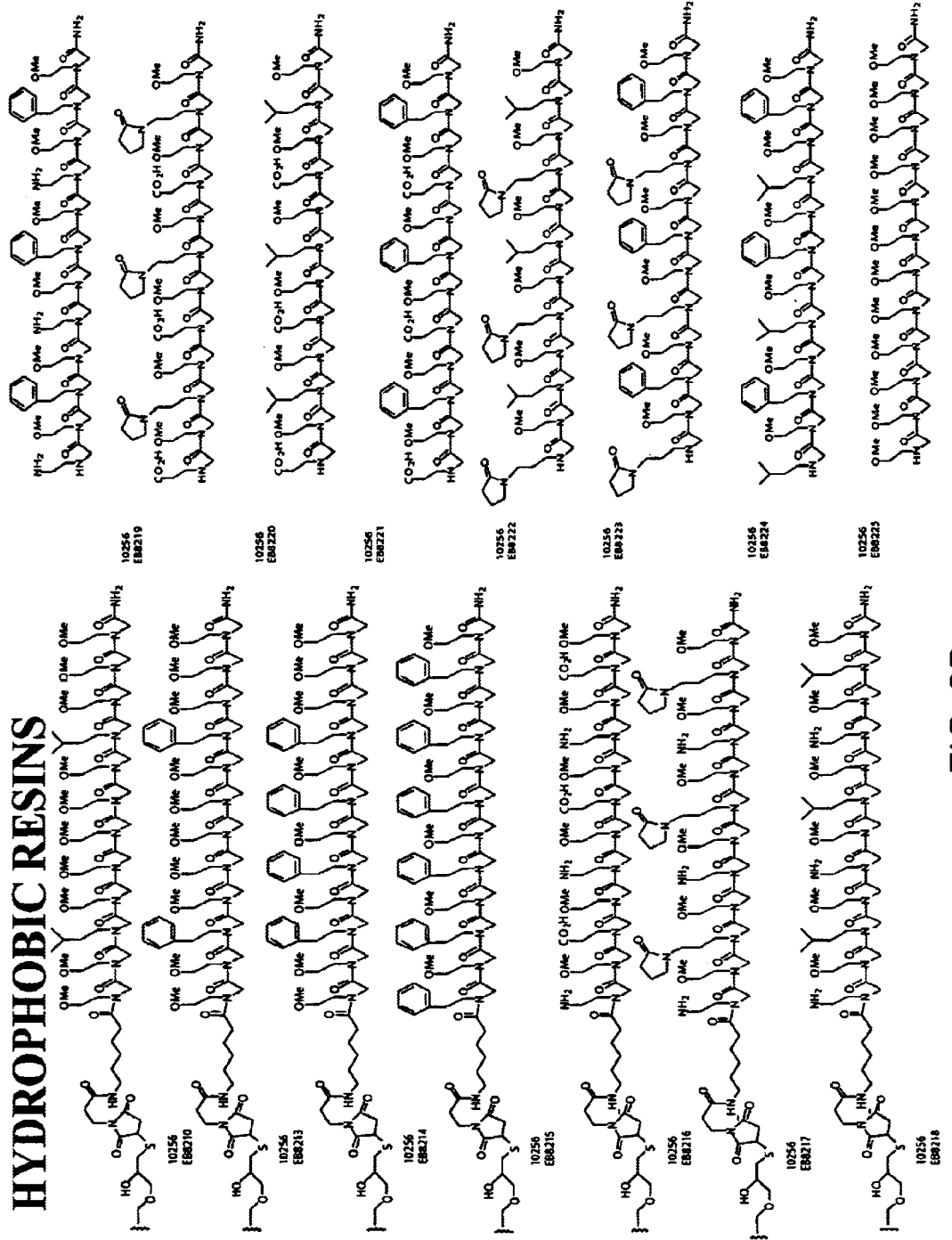
Figure 3C:
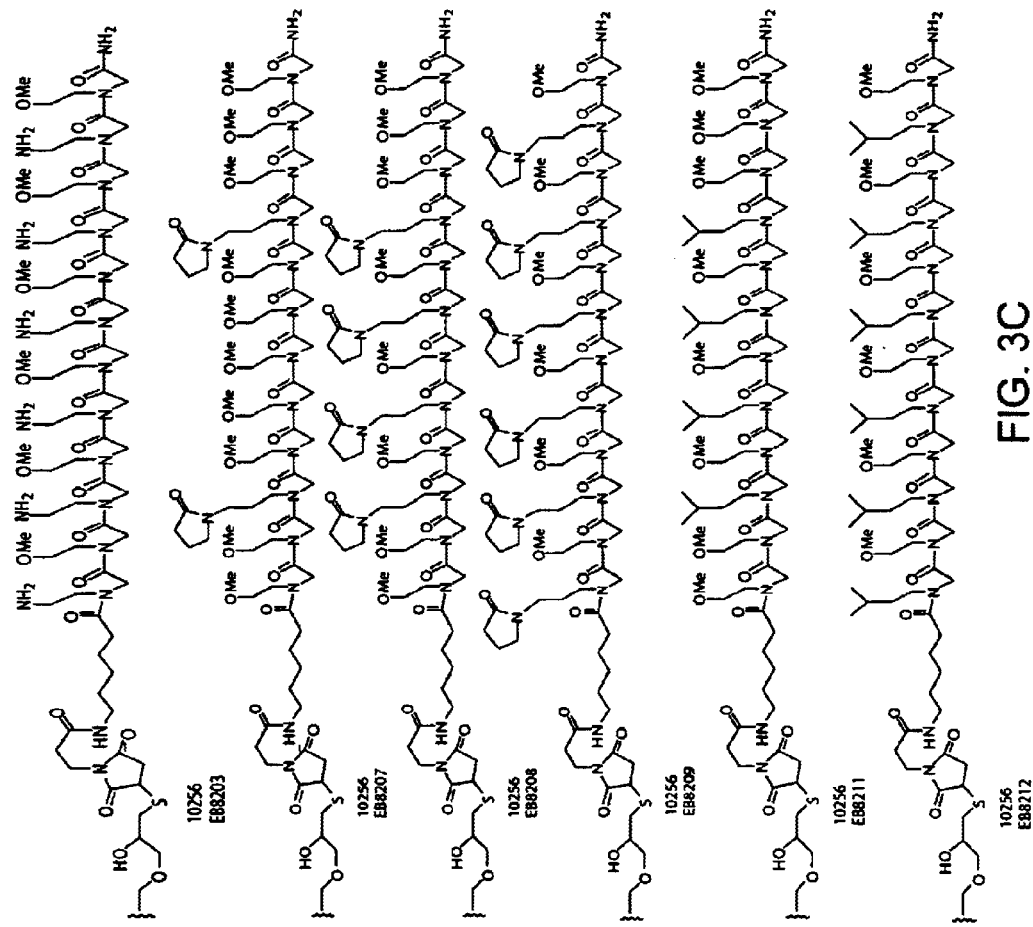

Table 1A indicates that each of the affinity properties is represented in the array at low (2 of 12 sidechains in a 12 mer), medium (4 of 12), and high (6 of 12) levels (15 12 mers). FIG. 1B shows how the array also includes all pairwise combinations of the five affinity properties (10 12 mers). The ligands of the array are schematically depicted in FIGS. 3A–C. The ligands of FIG. 3A have a dominant anionic character. The ligands of FIG. 3B have a dominant hydrophobic character (five of the ligands have both strong anionic and hydrophobic character). The ligands of FIG. 3C have a dominant cationic character.

The array described above is representative of a range of affinities possible with peptoids synthesized in accordance with the present invention. The affinity groups representing each of the affinity properties are just examples of some of the possible sidechains that may be used. As noted above, hundreds of diverse sidechains are available for peptoid synthesis, including, for example, those derived from many natural or nor-amino acid, unnatural amino acid, nucleotide base, enzyme cofactor, or sugar. Further, sidechains having isosteric and/or isoelectronic properties of known amino acid sidechains and/or nucleotide bases, or surrogates thereof may be used. Examples of non-natural amino acid sidechains are described in U.S. Pat. No. 5,656,660, incorporated by reference herein.

Other possible sidechains may include, without limitation, those derived from the following: acetichydrazide, N-acetylethylenediamine, 1-adamantamine, 2-adamantamine-HCL, 1-adamantanemethylamine, alanine, beta-alanine, alaninamide, allylamine, O-allylhydroxylamine, 3-amino-1,2-propandiol, 2-amino-1,3-propanediol, 4-amino-1-benzylpiperidine, 2-amino-1-butanol, 4-amino-1-butanol, 6-amino-1-indanone, 5-amino-1-naphthol, 5-amino-1-pentanol, 2-amino-1-phenylethanol, 3-amino-1-propanol, 5-amino-2-methoxypyridine, 1-amino-2-propanol, aninoacetonitrile, 4-aminobenzamide, 4-aminobenzylcyanide, 4-aminobiphenyl, 4-aminobutyricacid, 6-aminocaproicacid, 1-aminocyclohexan-2,3-diol, 1-aminocyclohexan-3,4,5-triol, trans-4-aminocyclohexanol, aminodiphenyimethane, 3-amino-N',N'-didecylpropanamide, 3-amino-N',N'-dihexylpropanamide, 3-amino-N',N'-dioctylpropanamide, 3-amino-N',N'-diphenethylpropanamide, 2-aminoethanol, N-(aminoethyl)carbazole, 2-aminoethylmethacrylate, 4-(2-aminoethyl)morpholine, (2-aminoethyl)phenylamine, aminomethylphosphonate, 2-(2-aminoethyl)pyridine, aminoethyl-5-(2,3-dichlorothiophenyl)sulfonamide, N-aminoethylthymine, 2-(2-aminoethoxy)ethanol, 6-aminogalactose, 2-aminoheptane, 1-aminoindan, 2-aminoindan, 5-aminoindan, 5-aminoindole, 4-aminomethylbenzenesulfonicacid, 2-(aminomethyl)benzimidazole 4-(aminomethyl)benzoicacid, (aminomethyl)cyclohexane, trans-4-aminomethyl)cyclohexanecarboxylicacid, (aminomethyl)cyclopropane, 2-(aminomethyl)pyridine, 3-(aminomethyl)pyridine, 4-(aminomethyl)pyridine, 5-aminomethyl-2-naphthalenesulfonicacid, 2-amino-5-methyloctane, 2,2-aminomethylphenylthiobenzylalcohol, 1-aminonaphthalene, 2-aminonaphthalene, 1-(4-aminophenyl)-ethylamine, 4-aminophenylphenylether, 2-(4-aminophenyl)-ethylamine, 2,4-aminophenyl)ethylamine, 2-arninpropane-1,3-diol, 3-aminopropanol, 1-3-aminopropyl)-2-pyrrolidinone, 1-3-aminopropyl)imidazole, 4-(3-aminopropyl)morpholine, 3-amninopyridine, 4-aminostyrene, amylamine, aniline, arginine, asparticacid, benzenesulfonylhydrazide, 1,4-benzodioxan-6-amine, benzoichydrazide, benzylcarbazate, N-benzyl-2-phenethylamine, benzylarmine, O-benzylhydroxylamine, biphenylamine, 1,4-bis(3-aminopropyl)piperazine, 3,5-bis (trifluoromethyl)benzylamine, 3-butoxypropylamine, t-butylcarbazate, 4-t-butylcyclohexylamine, O-t-butylhydroxylamine, t-butylarnine, butylamine, 4-butylaniline, 4-sec-butylaniline, 3-chloroaniline, 4-chloroaniline, 2-chloro-6-fluorobenzylthioethylamine, 2-(2-chlorophenyl)ethylamine, 2-(3-chlorophenyl)ethylamine, 2-(4-chlorophenyl)ethylamine, 5-chlorothiophene-2-sulphonylhydrazide, cycloheptylamine, 2-(1-cyclohexenyl)ethylamine, cyclohexylamine, 4-cyclohexylaniline, cyclopentylamine, cyclopropylamine, cysteamine, 2-(decyl)dodecylamine, decylamine, dehydroabietylamine, 1,4-diaminobutane, trans-1,4diaminocyclohexane, N,N-di-(2-aminoethyl)amine, 1,5-dianinonaphthalene, 1,3-diaminopropan-2-ol, 1,3-diaminopropane, N,N-dibenzylglycinamide, 3,4-dichlorobenzylamine, N,N-dihexylglycinamide, 2,3-dihydroxypropylamine, 6,7-dimethoxy-1,2,3,4-tetrahydroisoquinoline, 4,4'dimethoxybenz-hydrylglycinamide, 2,3-dimethoxybenzylamine, 3,5-dimethoxybenzylamine, 2,4-dimethoxybenzylamine, 3,4-dimethoxyphenethylamine, 3-dimethylaminopropylamine, 3,4-dimethylaniline, N,N-dimethylethylenediamine, 2,4-dimethylbutylamine, 3,7-dimethyloctylamine, 3,3-diphenyl-2-propenamine, 1,2-diphenylethylamine, 2,2-diphenylethylamine, 3,3-diphenylpropylamine, dodecylamine, epinephrine, ethanolamine, 3-ethoxypropylamine, 2-(4-ethoxy)phenethylamine, ethylamine, 4-ethylaniline, ethylenediamine, 2,2'-(ethylenedioxy)bis(ethylamine), 2-ethylhexylamine, 2-ethylpipecolinate, 1-ethylpropylamine, alpha-ethyltryptamine, 9-fluoreneamine, 4-fluorobenzylamine, N(2-fluorophenyl)piperazine, furfurylamine, D-glucosamine, glycinamide, glycine, glycine-beta-naphthylamide, guanidinoethylamine, guanidinopropylamine, guanidinobutylamine, 2-(4-guanidino) phenethylamine, 2,2,3,3,4heptafluorobutylamine, heptylamine, 1,6-hexanediamine, 1,6-hexanediamine, 3-hexenylamine, hexylamine, 2-(hexyl)octylamine, histamine, 3-hydroxytyrarmine, indoline, 4-iodoaniline, isoamylamine, isobutylamine, 3-isopropoxypropylamine, isopropylamine, 4-isopropylaniline, 4-methoxybenzene-sulphonylhydrazide, 4-methoxybenzylcarbazate, 2-methoxybenzylamine, 3-methoxybenzylamine, 4-methoxybenzylamine, 2-methoxyethylamine, methoxylamine, 2-methoxyphenethylamine, 3-methoxyphenethylamine, 4-methoxyphenethylamine, 3-methoxypropylamine, methylhydrazine, methylhydrazineocarboxylate, N-methyl-2,2-diphenylethylamine, methylamine, alpha-(methylarninomethyl)-benzylalcohol, 4-methyl-benzylamine, alpha-methylbenzylamine, 2-methylbutylamine, 3,4-(methylenedioxy)aniline, 3,4-methylenedioxyphenethylamine, beta-methylphenethylamine, 4-methylphenethylamine, cis-myritanylamine, 1(naphthyl)ethylamine, 1-naphthalene-methylamine, nicotinichydrazide, 4-nitrobenzoichydrazide, p-nitrophenethylamine, 3-nonenylamine, nonylamine, 2-norbornylamine, Norephedrine, norphenylephrine, octopamine, octylarnine, 2,2,3,3,3pentafluoropropylamine, phenelzinesulfate, 2-phenethylamine, 2-(phenoxy)cthylamine, 3-phenoxy-2-hydroxypropylamine, 3-(phenyl)propargylamine, 1-phenyl-1,2,3,4-tetrahydroisoquinoline, 4-phenyl-1,2,3,4-tetrahydroisoquinoline, 3-phenyl-1-propylamine, 5-phenyl-O-anisidine, phenylacetichydrazide, phenylalanine, 4-phenylbutylamine, L-phenylephrine, 4-phenyl-semicarbazide, 1-piperazinecarboxylate, piperidine, piperonylamine, propargylamine, propylamine, 4-propylaniline, serine, spermine, spernidine, 1,2,3,4-tetrahydro-1-naphthylamine, tetrahydrofurfurylamine, 1,2,3,4-tetrahydroisoquinoline, 2-thiophene-methylamine, p-toluenesulfonhydrazide, p-toluidine, 4-(trifluoromethyl)benzylamine, 3,4,5-trimethoxybenzylamine, 2,4,6-trimethoxybenzylamine, 2,4,6-trimethylbenzene-sulfonylhydrazide, tryptamine, phospho-tyramine, tyramine, veratrylarnine, m-xenylamine, m-xylylenediamine, and p-xylylenediamine.

The following documents, incorporated by reference herein, also provide further examples of sidechains that may be used: U.S. Pat. Nos. 5,877,278, 5,811,387, 5,447,916, 5,480,871, 5,919,967, and International Patent Application Nos. WO 91/19735, WO 96/40202, WO 96/40759, WO 97/19106, WO 94/03483, WO 95/04072, WO 98/09641, WO 98/52620, WO 97/10887 and WO 99/31124.

Sidechains which may be used as affinity groups for synthesizing hydrophilic peptoids in accordance with the present invention include: groups selected from the group of alkyl, (cycloalkyl)alkyl, (cycloheteroalkyl)alkyl, aralkyl, and heteroaralkyl, each substituted optionally from oxo, thia, halo, amino, hydroxy, cyano, nitro, thio, aminocarbonyl, carboxy, and imino. The alkyl, (cycloalkyl)alkyl, (cycloheteroalkyl)alkyl groups may be further selected from methyl, hydroxymethyl, prop-2-yl, 2-methylpropyl, pyrrolidylmethyl, methylthioethyl, 1-hydroxyethyl, thioethyl, aminocarbonylmethyl, aminocarbonylethyl, carboxymethyl, carboxyethyl, 4-aminobutyl, and 3-guanidinopropyl, guanidinoaryl, hydroxyaryl, amidoalkyl, phosphonyl alkyl, phosphonyl aryl, oligoether, and polyhydroxyalkyl. The aralkyl and heteroaralkyl groups may be further selected from phenylalkyl, hydroxyphenylalkyl, imidazolylalkyl, purinylalkyl, pyrimidinylalkyl, and indolylalkyl. Examples of sugars include furanosylalkyl, pyranosylalkyl, furanosyl, or pyranosyl, attached at any suitable atom. Sidechains which may be used as hydrophilic groups for synthesizing hydrophilic peptoids in accordance with the present invention include those selected from the group of alkyloxyalkyl, hydroxyalkyl, thioalkyl, alkylthioalkyl, alkylsulfinylalkyl, alkyloxycarbonylalkyl, and aminocarbonylalkyl. The sidechain may be further substituted, for example with one of methoxyethyl, hydroxyethyl, 1,3-dihydroxyprop-2-yl, 2-(hydroxymethyl)-1,3-dihydroxoxyprop-2-yl, and 2,3-dihydroxypropyl, alkylsulfoxidoalkyl, as well as side chains reported, or identified using the techniques described, in Chapman, R. G.; Ostuni, E.; Takayama, S.; Holmlin, R. E.; Yan, L.; Whitesides, G. M.; *J. Am. Chem. Soc.* 2000, 122, 8303-8304.

3. Kits

Figure 4:
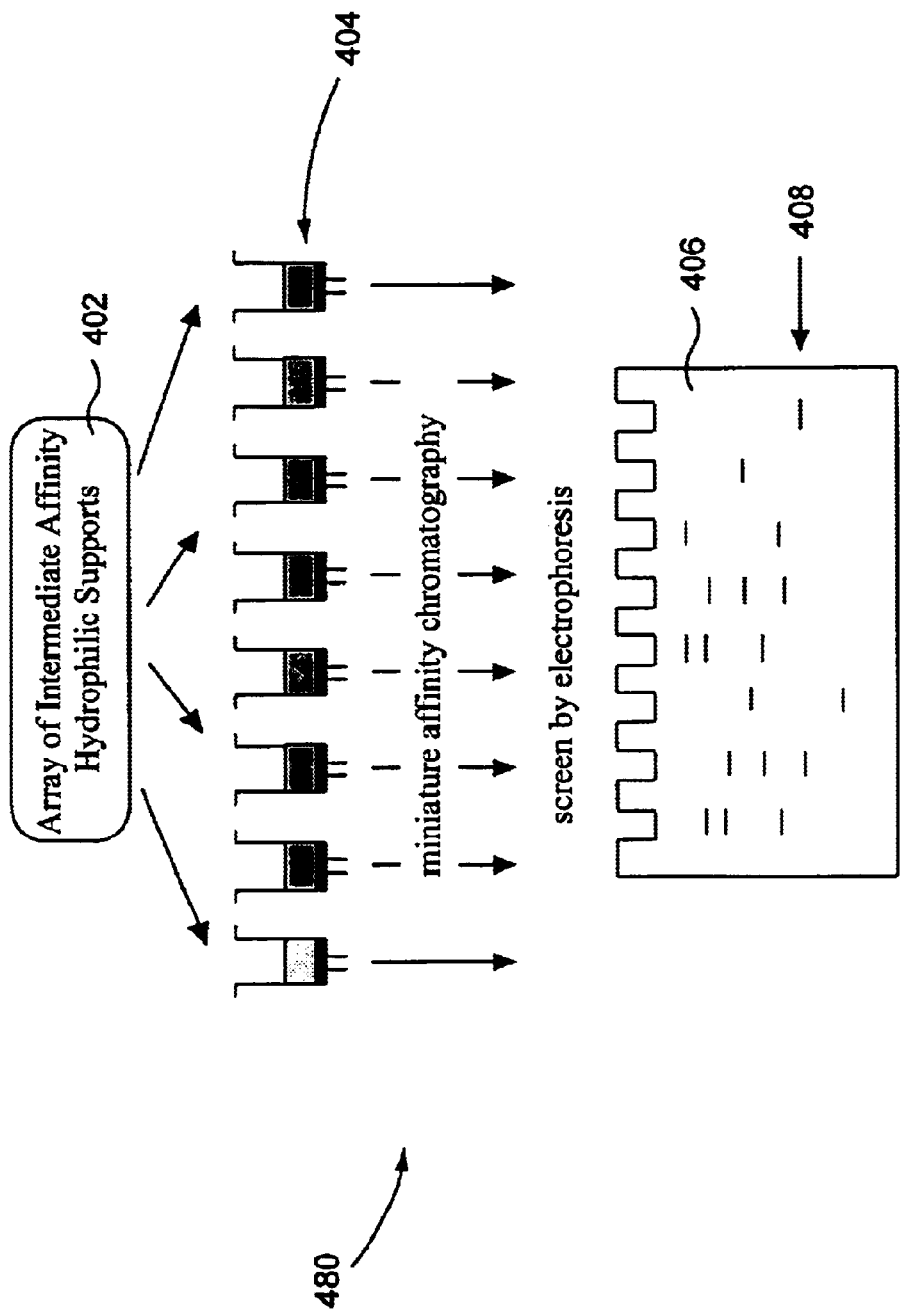
FIG. 4 schematically a kit and its mode of operation in accordance with one embodiment of the present invention.

The present invention also provides kits containing a plurality of hydrophilic chromatography supports in accordance with the present invention having a spectrum of affinity properties. In one embodiment, a screening kit for affinity chromatography is provided. FIG. 4 illustrates a kit in accordance with such an embodiment of the present invention. The kit 400 includes an array of intermediate affinity hydrophilic chromatography supports 402, such as described above. Supports from the array 402 are dispensed into receptacles 404 suitable for conducting affinity chromatography. The receptacles 404 may be separate compartments of a multi-compartment containment structure. One typical format for such a structure is a 96-well plate adapted for miniature affinity chromatography in that the wells are not closed at the bottom, but instead are instead suited for miniature affinity chromatography, for example fritted well plates. Such miniature chromatography fritted well plates are known to those of skill in the art.

In operation, a biological sample, for example a cell lysate, may be applied to the supports 402 in the receptacles 404, and the eluates may be run on an electrophoretic gel in order to screen for the support(s) that provide the best separation for the target biological sample component 408 in the sample. That support or supports may then be selected and used for large scale processing of the biological sample. It should be noted that the present invention, when configured in such a kit, advantageously allows for parallel processing of a biological sample to efficiently determine a support or supports having desirable affinity properties for conducting an affinity separation.

Suitable chromatography conditions are well known to those of skill in the art. The conditions may also be varied across different sets of receptacles in order to determine the optimal combination of affinity chromatography support and conditions for the desired separation. Sample conditions for an array of peptoid ligand-based hydrophilic supports used to separate proteins may be as follows:

TABLE 1

| Chromatography Type | Loading Buffer | Eluting Buffer |
| --- | --- | --- |
| Anion Exchange | 20 mM Tris; pH 7.0<br>10 mM NaCl | 20 mM Tris; pH 7.0<br>1.0 mM NaCl |
| Cation Exchange | 20 mM NaCitrate; pH 6.0<br>10 mM NaCl | 20 mM NaCitrate; pH 7.0<br>1.0 M NaCl |
| Hydrophobic | 20 mM Tris | 20 mM Tris |
| Affinity | 20% $AmSO_4$; pH 8.0<br>3 mM EDTA | 0% $AmSO_4$; pH 8.0<br>3 mM EDTA |

Of course, other conditions, such as the use and selection of washing, pH, and gradients may be used as will be apparent to those of skill in the biochemistry and protein purification arts. The conditions and parameters (i.e., gel composition, buffers, labels, etc.) for the gel electrophoresis are also well know in the art.

It should also be noted that kits in accordance with the present invention may also have an array of hydrophilic supports deployed on nano-scale chips, for example chips composed of silicon, gold on glass, or aluminum on glass. In this regard, the present invention may be implemented with technologies such as are described in U.S. Provisional Patent Application Nos. 60/141,469 and 60/209,711, U.S. Pat. Nos. 5,744,305 and 5,874,219, all of which are incorporated herein by reference.

4. Applications

Affinity supports in accordance with the present invention may be loaded into affinity chromatography columns according to methods well known to those of skill in the art, and may then be used to conduct separations for a variety of purposes. These applications include biological sample component (e.g., protein) purification and determination and comparison of differential protein expression patterns (e.g., proteomics). These techniques provide useful tools in diagnostics and drug development, among other research and production applications.

Determining and Comparing Biological Sample Component Expression Patterns

Figure 5:
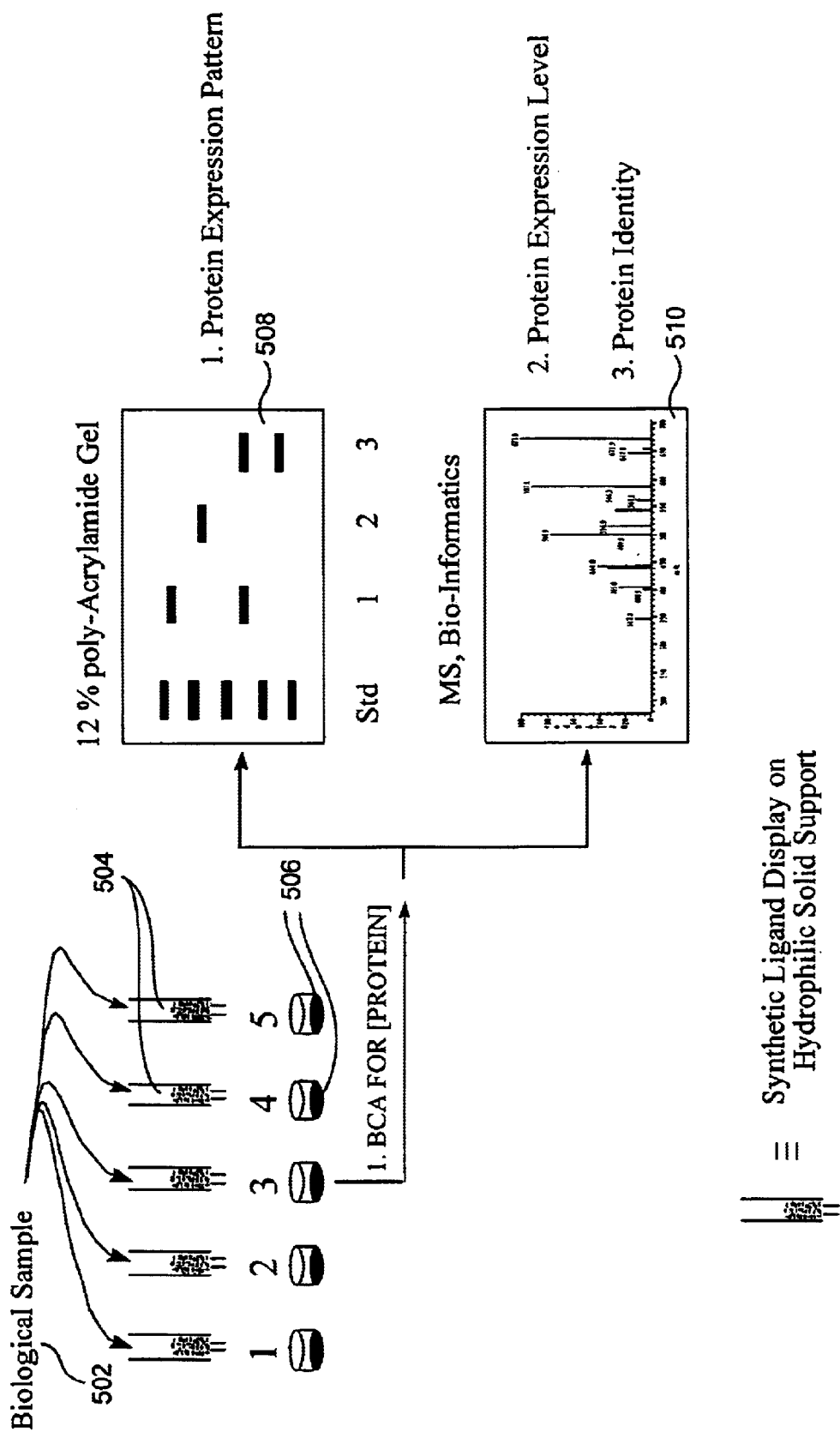
FIG. 5 schematically depicts a process for conducting a differential protein expression (proteomic) analysis in accordance with one embodiment of the present invention.

FIG. 5 illustrates an example of a proteomic application of the present invention. A biological sample 502 is applied to a hydrophilic affinity support 504, such as described above, composed of a hydrophilic ligand coupled to a biological sample-compatible hydrophilic matrix (substrate). The ligand includes affinity property groups and hydrophilic groups pendent from a backbone configured to at least partially resolve components of the biological sample. The biological sample components of the sample are fractionated by the hydrophilic support to provide an enriched fraction 506. The enriched fraction 506 may be that portion of the applied biological sample that does not bind to the affinity support, or, more frequently, a or the part which initially binds but is subsequently eluted from the support. The enriched fraction 506 is then analyzed to determine a biological sample component expression pattern 508, and possibly other features 510 (e.g., protein expression level and protein identity) for the biological sample.

The expression pattern may be determined by running the enriched fractions obtained from the chromatography using the hydrophilic affinity supports on an electrophoretic gel. A label, for example a radioactive label or dye, may be added to the enriched fractions prior to loading of the gel so that separate bands of biological sample component (e.g., protein) may be seen following processing of the completed gel.

Techniques used to determine other features of the biological sample from the enriched fractions obtained from affinity chromatography using the affinity supports of the present invention include mass spectrometry (MS), bio-informatics (comparison of data obtained with relational databases of biological and biochemical information and macromolecular structure analysis techniques, such as are described in U.S. patent application Ser. No. 09/580,380, filed May 26, 2000, incorporated by reference herein.

This proteomic approach may be practiced in a variety of different ways. The biological sample applied to the affinity support may be a single sample or may be two or more different samples obtained from different biological sources (e.g., cell lines, tissue samples, biological fluids, such as blood, etc.). Similarly, the affinity support to which the one or more biological samples are (separately) applied may be a single support, or may be two or more supports having different properties. Also, the chromatography conditions used may vary.

Thus, an expression pattern may be obtained for a single biological sample run on a single affinity support. Or, a sample may be run on a plurality of supports and/or using a number of different chromatography conditions and their expression patterns compared in order to determine the best support and/or conditions with which to process a given sample. As noted above, the present invention provides a kit for making such a determination.

In addition, a plurality of biological samples may be run on one or more affinity supports and their expression patterns compared in order to determine expression differences that correlate with phenotypic differences in the samples. For example, healthy and diseased samples of the same tissue may be processed in this manner in an attempt to elucidate a phenotype of the disease state. Or, tissues of different types but subject to the same disease state may be processed in this manner in order to determine if agents associated with the disease state are manifested in different tissues.

Reducing Complexity (Including Biological Sample Component Purification)

Hydrophilic affinity supports in accordance with the present invention may also be used to reduce the complexity of a biological sample by performing affinity chromatography. A biological sample may be applied to a hydrophilic affinity support in accordance with the present invention resulting in the fractionation of the biological sample's components. Such an approach may be used to separate and purify a component, such as a protein, from the biological sample. A particular support or supports suitable for performing such a separation may be selected as described above with reference to the kits provided by the present invention.

One particular embodiment of this approach involves a two-stage process. According to this embodiment, a biological sample may be applied to a multi-compartment containment structure wherein one or more of the compartments contains a plurality of peptoids from an array of peptoids having a range of intermediate affinities for biological sample components, as described above. In this way, peptoids having affinity properties suitable for achieving good separation or complexity reduction of a sample may be preliminarily identified in a group. Based on the degree of complexity reduction achieved by peptoids in different compartments of the multi-compartment containment structure, peptoids from a compartment from the multi-compartment containment structure may be selected for further processing.

Another sample of the same biological sample may then be applied to a second multi-compartment containment structure having separate compartments containing the peptoids from the selected peptoid-containing compartment from the first multi-compartment containment structure. As noted above, conditions and parameters for this processing will be readily apparent to those having skill in the biochemistry and protein purification arts.

Differences in complexity reduction achieved by the different peptoids contained in the second multi-compartment containment structure may then be determined and a peptoid or peptoids providing the best complexity reduction may be selected for further processing of a particular biological sample component. In this way, the optimal affinity substrate for performing a protein separation or purification may be efficiently determined.

A further application of the present invention in the reduction of the complexity of biological samples may be in the preparation of samples for mass spectra-based identification and/or quantitation of the components of the biological samples, e.g., using commercially available ICAT ™ processing (Applied Biosystems, Foster City, Calif.). In this way, a complex biological sample may be fractionated prior to the ICAT procedure so that ICAT results may be obtained for less populous sample components. The ICAT procedure is further described in the following documents, each of which is incorporated by reference herein in its entirety for all purposes: *Measuring gene expression by quantitative proteome analysis* Gygi S P, Rist B, Aebersold R, Current Opinion in Biotechnology 11: (4) 396–401 AUG. 2000; and International Patent Application No. WO 00/11208.

Serial Processing

The present invention also provides a method for serially processing a biological sample using hydrophilic affinity supports in accordance with the present invention in order to provide enhanced separations by using a plurality of supports in the separation process. The supports to be used may be selected by use of a kit as described above. A biological sample may be applied to a first hydrophilic affinity support such as described above, and fractionated to provide an enriched fraction. The enriched fraction may then applied to a second affinity support and fractionated again to provide a further enriched fraction. This process may be repeated as many times as are desired, with the enriched fraction of each fractionation being desalted and placed in a new buffer compatible with the next affinity support.

Indirect Assays

If an antibody to a protein of interest is known, an ELISA or other antibody-based assay (e.g., radio-immuno assay, "RIA") could be performed to determine if a chromatography column packed with a peptoid affinity support in accordance with the present invention was able to bind and release the protein of interest.

MPLC

Peptoid affinity supports in accordance with the present invention can be packed into a chromatography column (e.g., a medium pressure (<150 psi.) liquid chromatography (MPLC) column) and used in a standard gradient elution mode.

Thus the sample to be separated may be loaded on the column under one set of non-eluting (or low-eluting) conditions and the analytes of interest eluted by running a gradient of an eluting solvent or buffer. This allows complex samples to be fractionated.

5. EXAMPLES

The following examples provide details concerning the synthesis and characteristics of the hydrophilic affinity chromatography supports in accordance with the present invention, their components, and applications. It should be understood the following is representative only, and that the invention is not limited by the detail set forth in these examples.

Example 1

Preparation of a Peptoid on a Hydrophilic Support

Figure 6:
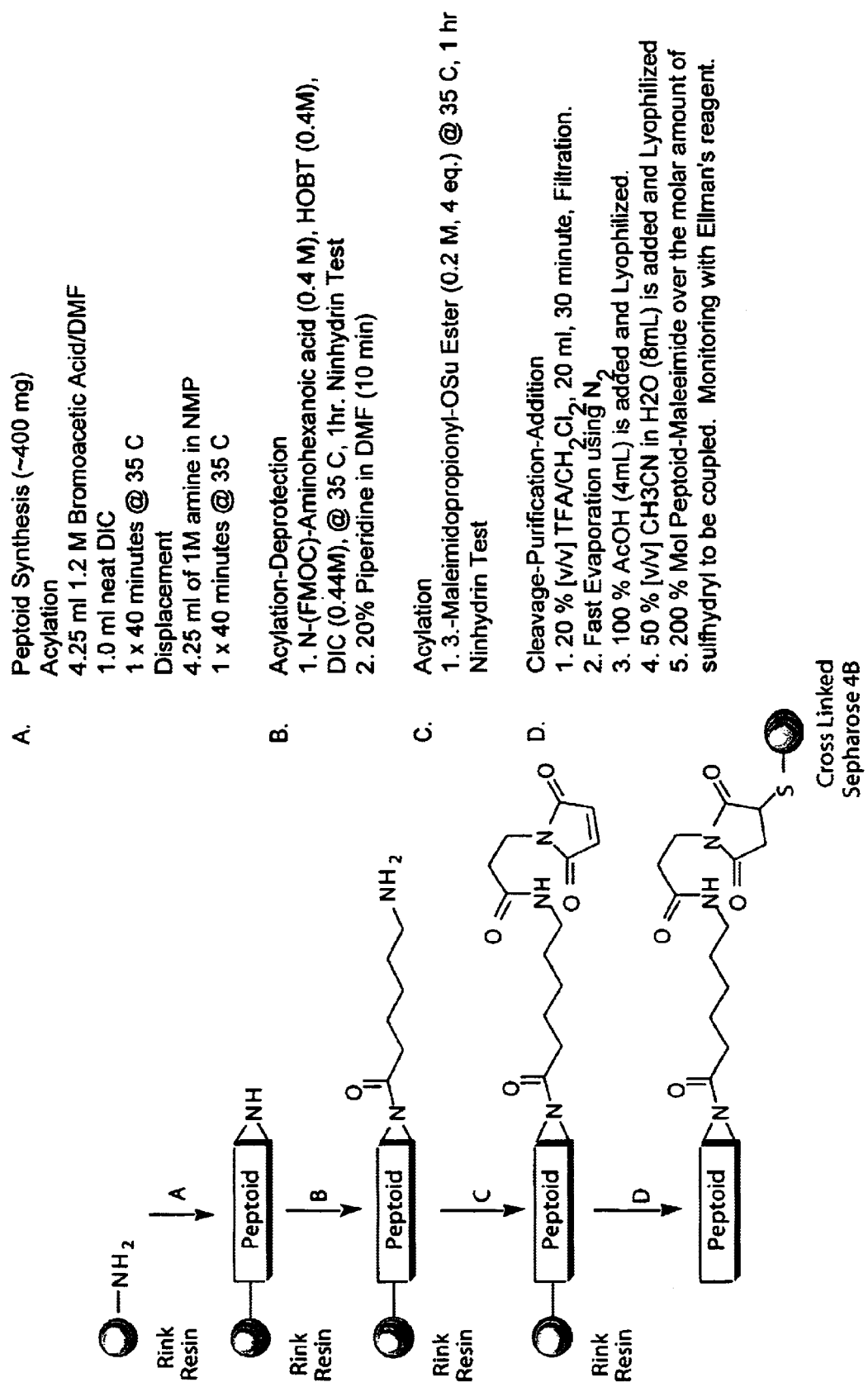
FIG. 6 schematically depicts a process for synthesizing hydrophilic peptoids on a hydrophilic substrate in accordance with one embodiment of the present invention.

Peptoids were prepared on Rink amide polystyrene resin as illustrated and described in FIG. 6, part A, Peptoid Synthesis. The synthesis procedure is also reported in Figliozzi, G. M., Goldsmith, R., Ng, S. C., Banville, S. C., Zuckermann, R. N. *Methods Enzymol.* 1996, 267, 437–447, the disclosure of which is incorporated by reference herein for all purposes.

Before cleavage, the peptoids on Rink resin were treated with N-FMOC-aminohexanoic acid (0.4 M), HOBT (0.4 M), DIC (0.44 M) at 35° C. for 1 hr. Double coupling was performed when the ninhydrin test exhibit blue colored beads. After piperidine treatment to remove the FMOC protecting group, the beads were treated with 3-maleimido propionic acid (0.4 M), HOBT (0.4 M), DIC (0.44 M) for 1 hr. at 35° C. After cleavage from the resin using 95% TFA [v/v] in $H_2O$ the resulting solution was filtered, mixed with $H_2O$, frozen and lyophilized. The resulting product was dissolved in 100% AcOH, frozen, lyophilized and dissolved again in 50% [v/v] $CH_3CN$ in $H_2O$, frozen and lyophilized.

The peptoid purity was assessed using HPLC and mass spectrometry typically indicating >90%. The resulting product was then dissolved in a $NaH_2PO_4$ (0.1 M), buffered at pH 7 and added to thiosepharose resin. The amount of free thiols before and after addition of the maleimido peptoid was determined using the Ellmans reagent, DTNB. When the remaining free thiols were less the 10% of the initial amount of free thiols, the remaining free thiols were capped with maleimide.

This operation was repeated for each resin to obtain an array of peptoids displayed on a hydrophilic solid support.

Example 2

Evaluation of Fabricated Hydrophilic Affinity Supports

Each solid phase attached peptoid was packed in a column and loaded with a cell lysate. After a certain period, the column was washed with the loading buffer. The resin bound proteins were eluted using a variety of elution buffers. The fractions collected were analyzed using polyacrylamide gel electrophoresis.

The versatility of these materials was evaluated using four criteria: reproducibility, binding capacity, enrichment and specificity. The structures of the various peptoids used in these evaluation are found in FIGS. 3A–C.

Figure 7:
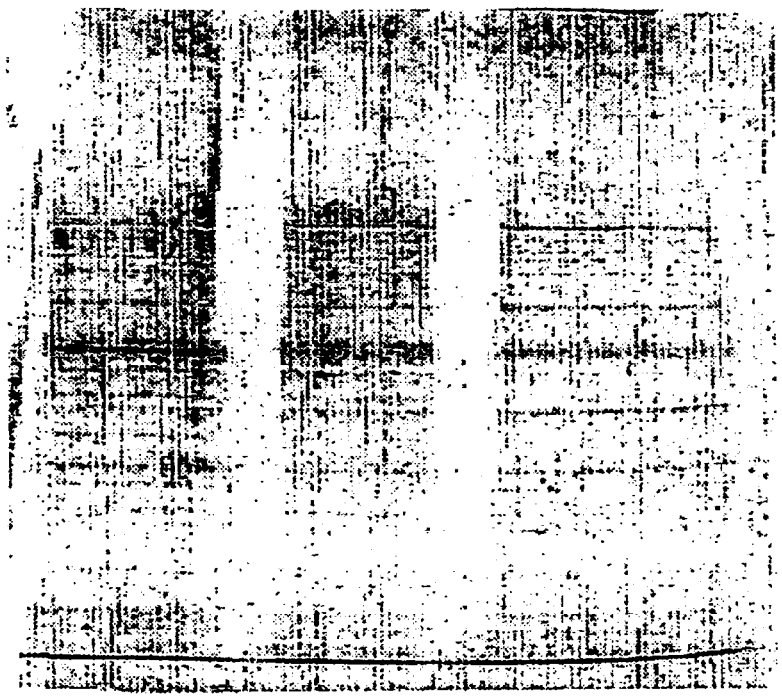
FIG. 7 depicts an electrophoretic gel illustrating the reproducibility of chromatography columns prepared using supports in accordance with the present invention.

FIG. 7, shows the elution product reproducibility of peptoid/sepharose column after three loadings, washings and elutions of the HeLa cell lysate. The gel shows a high degree of reproducibility.

FIG. 8 shows the binding capacity of peptoid sepharose columns EB8224 and EB8225 toward protein sets of a HeLa cell lysate. EB8224 bound 7% of the cell lysate, while EB8225 bound 11% of the cell lysate. This demonstrates that these supports are able to significantly reduce the complexity of the cell lysate, as well as demonstrating the divergent nature of the different ligands and their abilities to bind differential protein fractions, respectively The potential for specificity and enrichment is also demonstrated in that the resolved bands in the elution fractions are many-fold enriched over the load fraction (whole cell lysate) and these bands are also resolvable in the eluate whereas they are not in the load.

Figure 9:
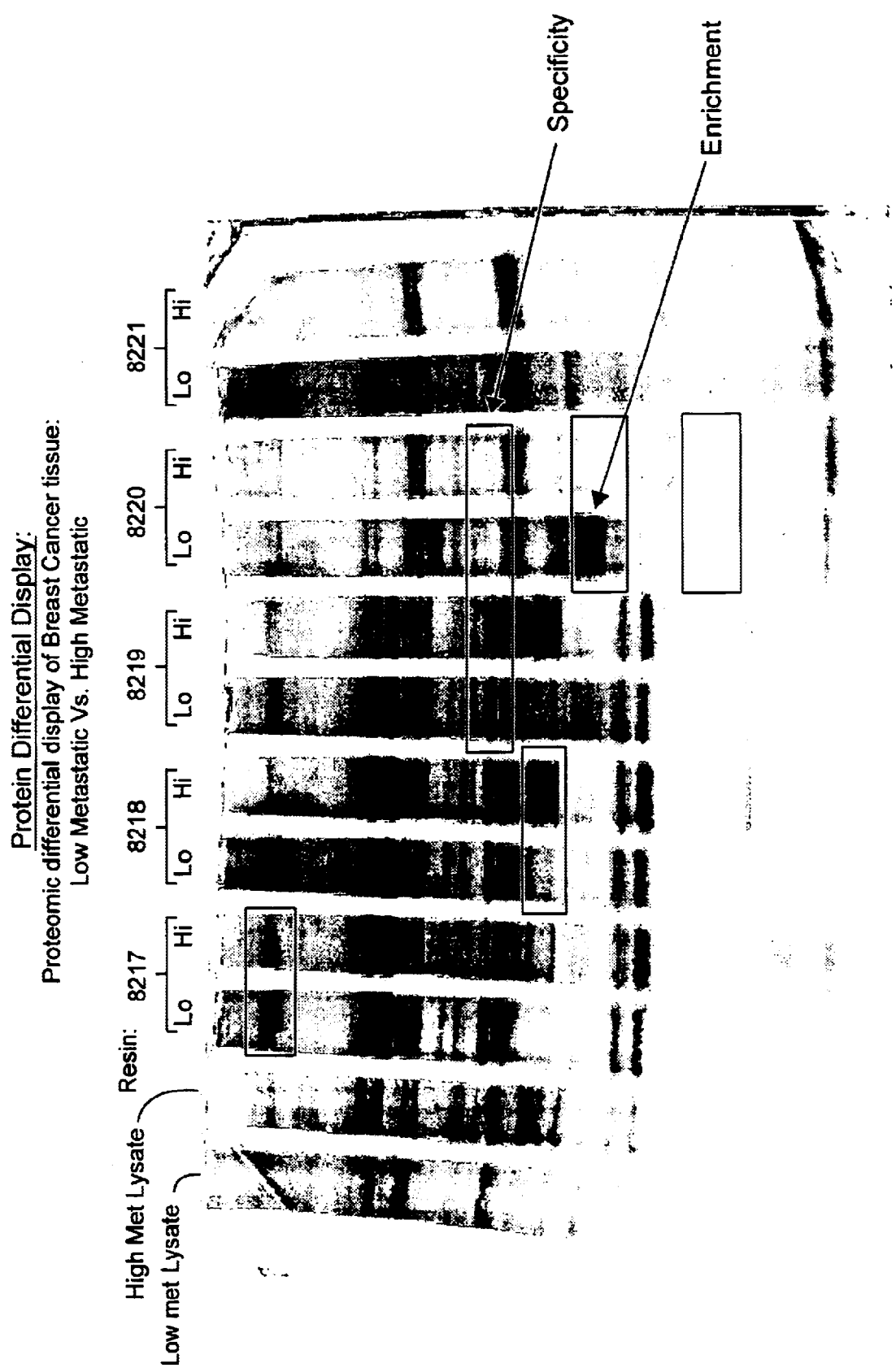
FIG. 9 depicts an electrophoretic gel illustrating the specificity and enrichment achievable by chromatography columns prepared using supports in accordance with the present invention.

FIG. 9 shows enrichment and specificity of peptoid sepharose columns EB8217–8221 in a proteomic differential display of breast cancer tissue (low metastatic vs. high metastatic). An array of supports was used to fractionate proteins of high and low metastatic biological samples (in this case cell lysates) and analyze the differences between their phenotypes by looking at differences in the protein expression pattern (the proteome) for the presence or the absence of a protein and the abundance of specific proteins. This gel demonstrates the range of binding affinities achievable with an array of supports in accordance with the present invention, as evidenced, for example, by the specificity differences that may be observed between EB8220 and EB 8221. In addition, due to the nature of the resins and/or their design, the results demonstrate that there are subsets of protein in the loaded cell lysates that will bind to one resin but not bind to any other resin. Thus, the present invention provides the ability to cover the space of the proteome in a substantially resolvable manner.

The gel also demonstrates the ability of affinity substrates in accordance with the present invention to enrich components of a biological sample and enable analysis of differences in protein expression between, in this example, high and low metastatic tissues, as evidenced by the observable differences in expression between the high and low metastatic tissues samples in the expression patterns provided by support EB8220. In the case of EB8220, the low metastatic tissue sample can be seen to have a much higher expression of a particular protein than the high metastatic tissue. Such a finding may allow an researcher to investigate a possible role for the identified protein in suppressing metastasis, for example.

Example 3

Identification of a Support Ligand that Selectively Binds

Figure 10:
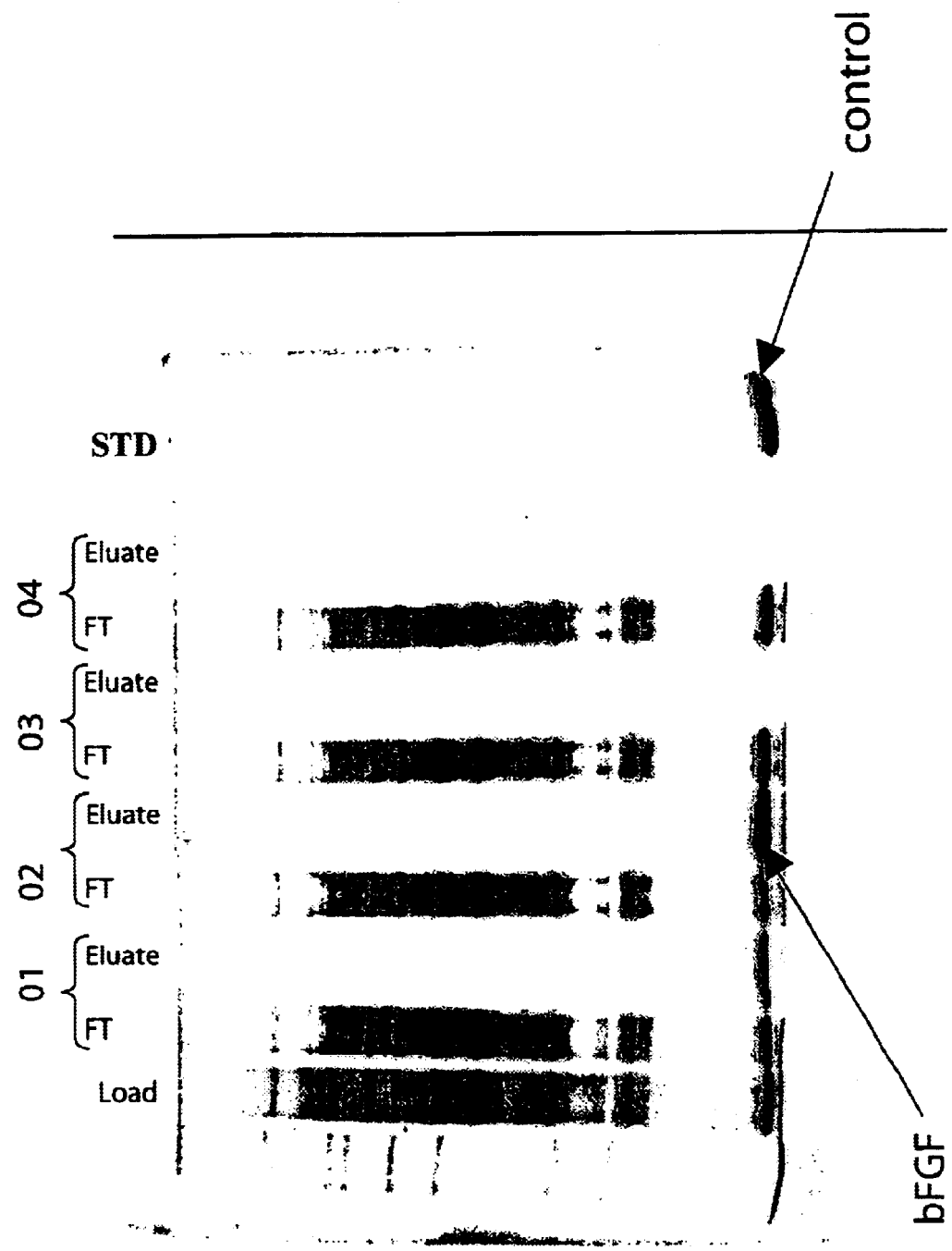
FIG. 10 depicts an electrophoretic gel illustrating the identification of a peptoid ligand that selectively binds a protein in a cell lysate in accordance with the present invention.

Four peptoid-based affinity supports prepared in accordance with the present invention were used to purify a protein from a crude cell lysate. The four columns used in this example, identified as 01, 02, 03 and 04 in FIG. 10, were the columns identified as EB8201, EB8202, EB8203 and EB8204, respectively, in FIGS. 3A and 3C. A peptoid that binds selectively to the protein FGF (Fibroblast Growth Factor) was located. Each different column was loaded with a FGF-containing cell lysate and run using the cationic conditions described above in Table 1. The flow through fraction (FT) from the column and the initially bound and then eluted fraction (Eluate) were subjected to gel electrophoresis together with a FGF standard. The peptoid ligand (FIG. 4b, lane 6; bFGF) that bound selectively to FGF (FIG. 4b, lane 10) was determined, as shown in FIG. 10.

Example 4

Parallel Processing

A cell lysate of a yeast extract with overexpression of bFGF was processed in parallel on several different intermediate affinity chromatography supports in accordance with the present invention. The load, flow through, and eluates were then run on electrophoretic gels as described above. Results and elution conditions are shown in FIG. 11. The legend in FIG. 11 indicates the columns and conditions used by providing a key to the alphanumeric references appearing below each gel panel. The various conditions referred to are noted in Table 1, and the various column compositions referred to are illustrated in FIGS. 3A–3C.

The results demonstrate that a protein of research interest may be purified utilizing a one-step affinity purification process in accordance with the present invention that overcomes the time and obstacles involved with standard chromatography using commercially available resins. The techniques of the invention can accomplish rapid research purification of novel proteins for study.

Conclusion

Although the foregoing invention has been described in some detail for purposes of clarity of understanding, it will be apparent that certain changes and modifications may be practiced within the scope of the appended claims. For example, while the present disclosure emphasizes the use of peptoids, it should be understood that the scope of the invention is not so limited and other molecules having the appropriate properties and function as described herein may also be used. It should also be noted that there are may alternative ways of implementing both the process and apparatus of the present invention. Accordingly, the present embodiments are to be considered as illustrative and not restrictive, and the invention is not to be limited to the details given herein, but may be modified within the scope and equivalent of the appended claims.

What is claimed is:

1. A method of determining a biological sample component expression pattern for a biological sample, comprising:

applying a biological sample to an affinity support comprising a ligand coupled to a biological sample-compatible hydrophilic matrix, said ligand comprising a backbone having a plurality of affinity property groups and hydrophilic groups pendent therefrom, and said ligand having a binding affinity characterized by a specificity for one or more components of the biological sample that is intermediate between charge-based and antibody-based ligands and being configured to at least partially resolve the one or more components of said biological sample;

chromatogaphically resolving the one or more components of the biological sample to provide thereby an enriched fraction; and determining a biological sample component expression pattern for the biological sample using the enriched fraction in at least one of an electrophoretic and a mass spectroscopic technique.

2. The method of claim 1, wherein the one or more biological sample components comprise proteins.

3. The method of claim 1, wherein the one or more biological sample components comprise nucleotides.

4. The method of claim 1, wherein said ligand comprises:

a peptoid backbone; and a plurality of affinity property groups and hydrophilic groups being pendent from said peptoid backbone.

5. The method of claim 4, wherein said hydrophilic groups are intercalated with said affinity property groups.

6. The method of claim 5, wherein said hydrophilic groups alternate with said affinity property groups along said peptoid backbone.

7. The method of claim 6, wherein said affinity property groups are selected from the group consisting of alkyl, (cycloalkyl)alkyl, (cycloheteroalkyl)alkyl, aralkyl, and heteroaralkyl, each substituted optionally from the group consisting of oxo, thia, halo, amino, hydroxy, cyano, nitro, thio, aminocarbonyl, carboxy, and imino.

8. The method of claim 7, wherein said affinity property groups are selected from the group consisting of methyl, hydroxymethyl, prop-2-yl, 2-methylpropyl, pyrrolidylmethyl, methylthioethyl, 1-hydroxyethyl, thiomethyl, aminocarbonylmethyl, aminocarbonylethyl, carboxymethyl, carboxyethyl, 4-aminobutyl, and 3-guanidinopropyl, guanidinoaryl, hydroxyaryl, amidoalkyl, phosphonyl alkyl, phosphonyl aryl, oligoether, and polyhydroxyalkyl.

9. The method of claim 7, wherein said affinity property groups are selected from the group consisting of optionally substituted aralkyl and heteroaralkyl.

10. The method of claim 9, wherein said affinity property groups are selected from the group consisting of phenylmethyl, hydroxyphenylmethyl, imidazolylmethyl, purinylmethyl, pyrimidinylmethyl, and indolylmethyl.

11. The method of claim 7, wherein said affinity groups are selected from the group consisting of optionally substituted amonioalkyl, and trialkylamonioalkyl.

12. The method of claim 7, wherein said affinity property groups are optionally substituted carboxylatoalkyl.

13. The method of claim 4, wherein said hydrophilic groups are selected from the group consisting of alkyloxyalkylenyl, aminoalkyl, alkylaminoalkyl, quaternary ammoniumalkyl, hydroxyalkyl, thioalkyl, alkylthioalkylenyl, carboxyalkyl, alkyloxycarbonylalkyl, and aminocarbonylalkyl.

14. The method of claim 4, wherein said hydrophilic group is alkyloxyalkyl.

15. The method of claim 4, wherein said hydrophilic group is selected from the group consisting of methoxyethyl, hydroxyethyl, 1-hydroxyethyl-2-hydroxyethyl, and 2,3-dihydroxypropyl.

16. The method of claim 4, wherein about 50% of said pendant groups are affinity property groups.

17. The method of claim 16, wherein about 33% of said pendant affinity property groups have a common affinity property.

18. The method of claim 16, wherein about 67% of said pendant affinity property groups have a common affinity property.

19. The method of claim 16, wherein about 100% of said pendant affinity property groups have a common affinity property.

20. The method of claim 4, wherein said affinity property groups and said hydrophilic groups are pendant from nitrogen atoms in the backbone.

21. The method of claim 4, wherein said biological sample is derived from a homogeneous source.

22. The method of claim 21, wherein said homogeneous source is a cell line.

23. The method of claim 4, wherein said biological sample is derived from a heterogeneous source.

24. The method of claim 23, wherein said heterogeneous source is one or more tissue samples.

25. The method of claim 23, wherein said heterogeneous source is one or more blood samples.

26. The method of claim 1, wherein the intermediate binding affinity is characterized by the ligand interacting with the components of the biological sample by a combination of non-specific molecular forces consisting essentially of ionic, van der Waal's and hydrogen bond interactions.

27. The method of claim 4, wherein the ligand is selected from the group consisting of the following:

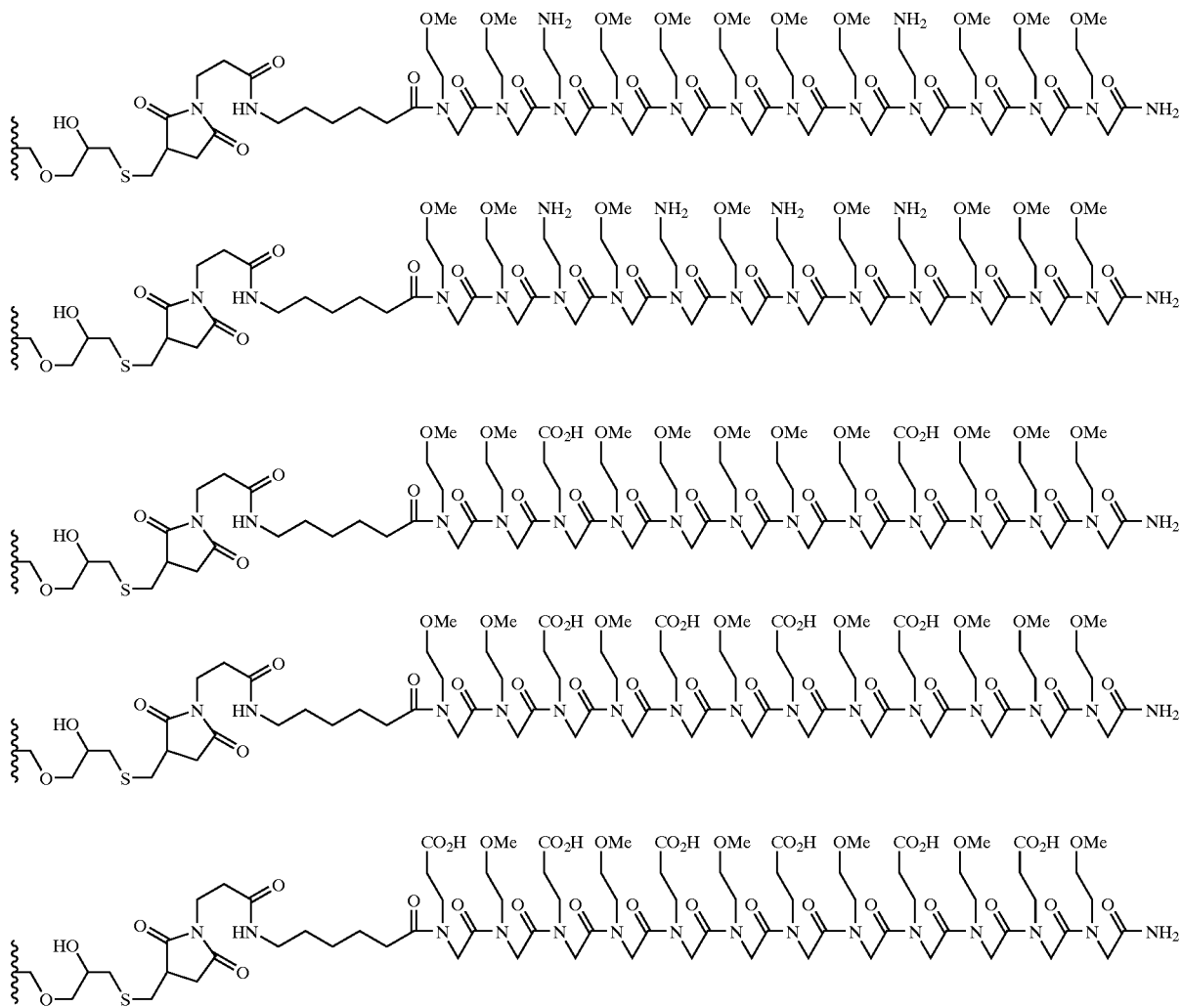

-continued
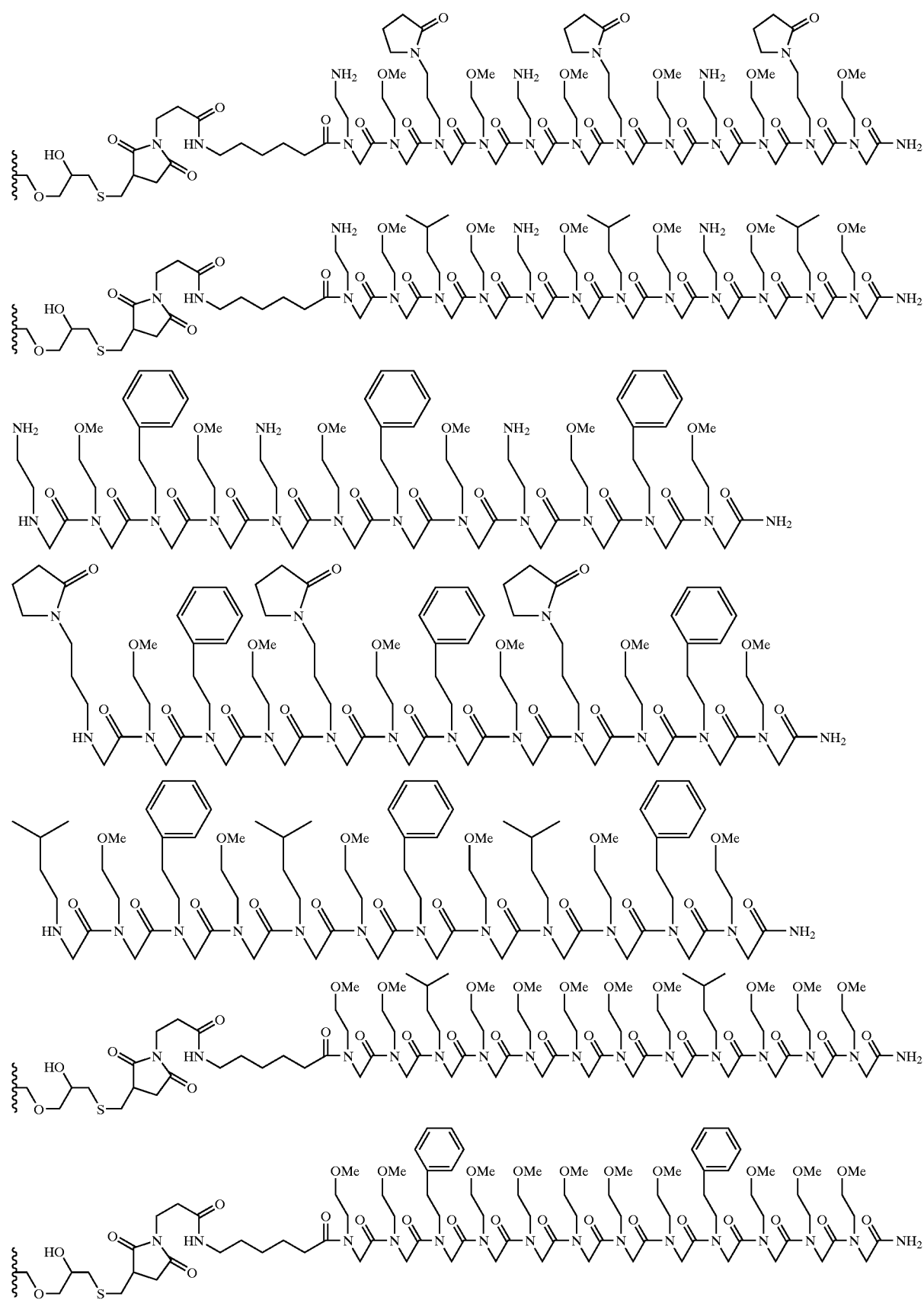

-continued
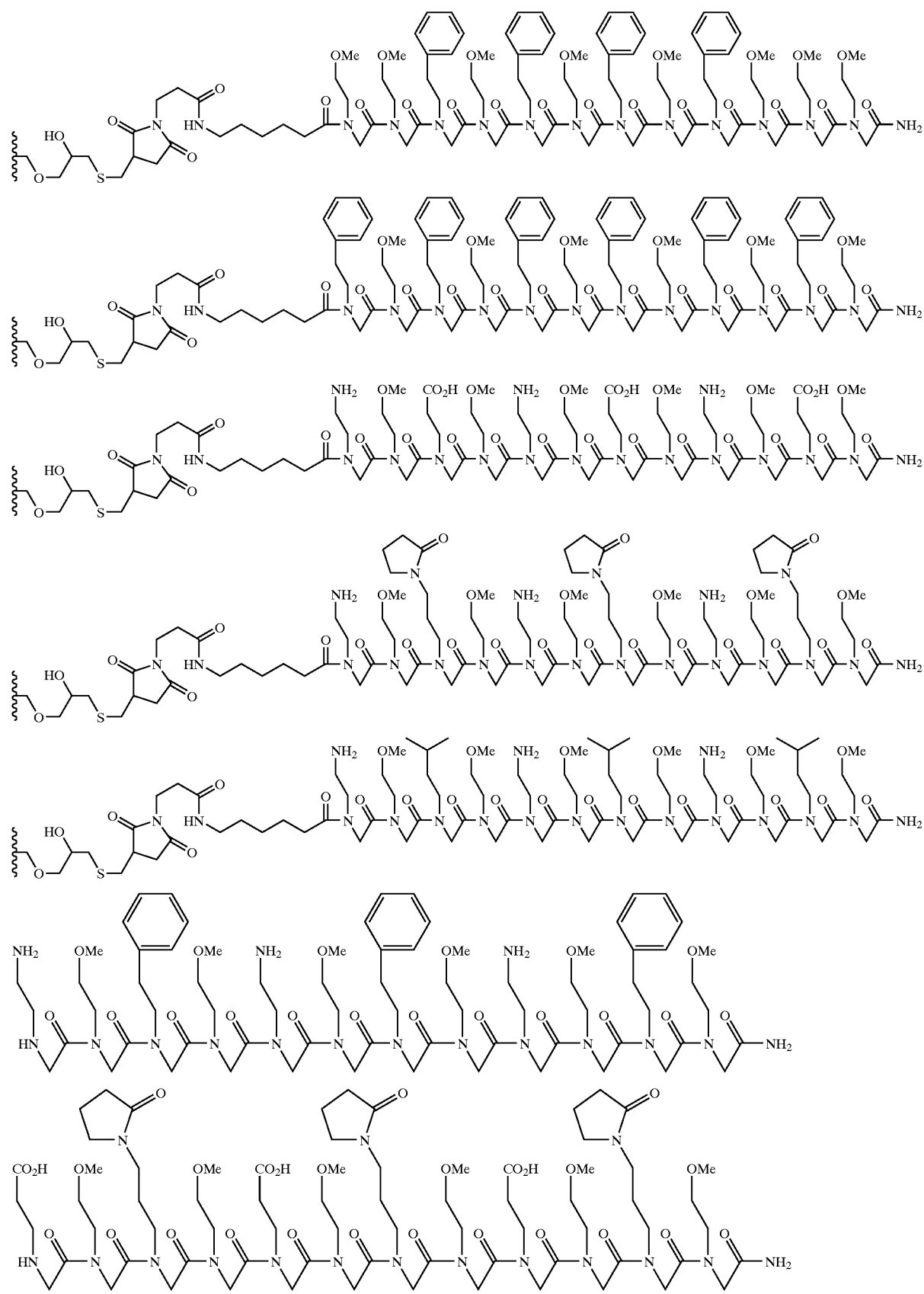

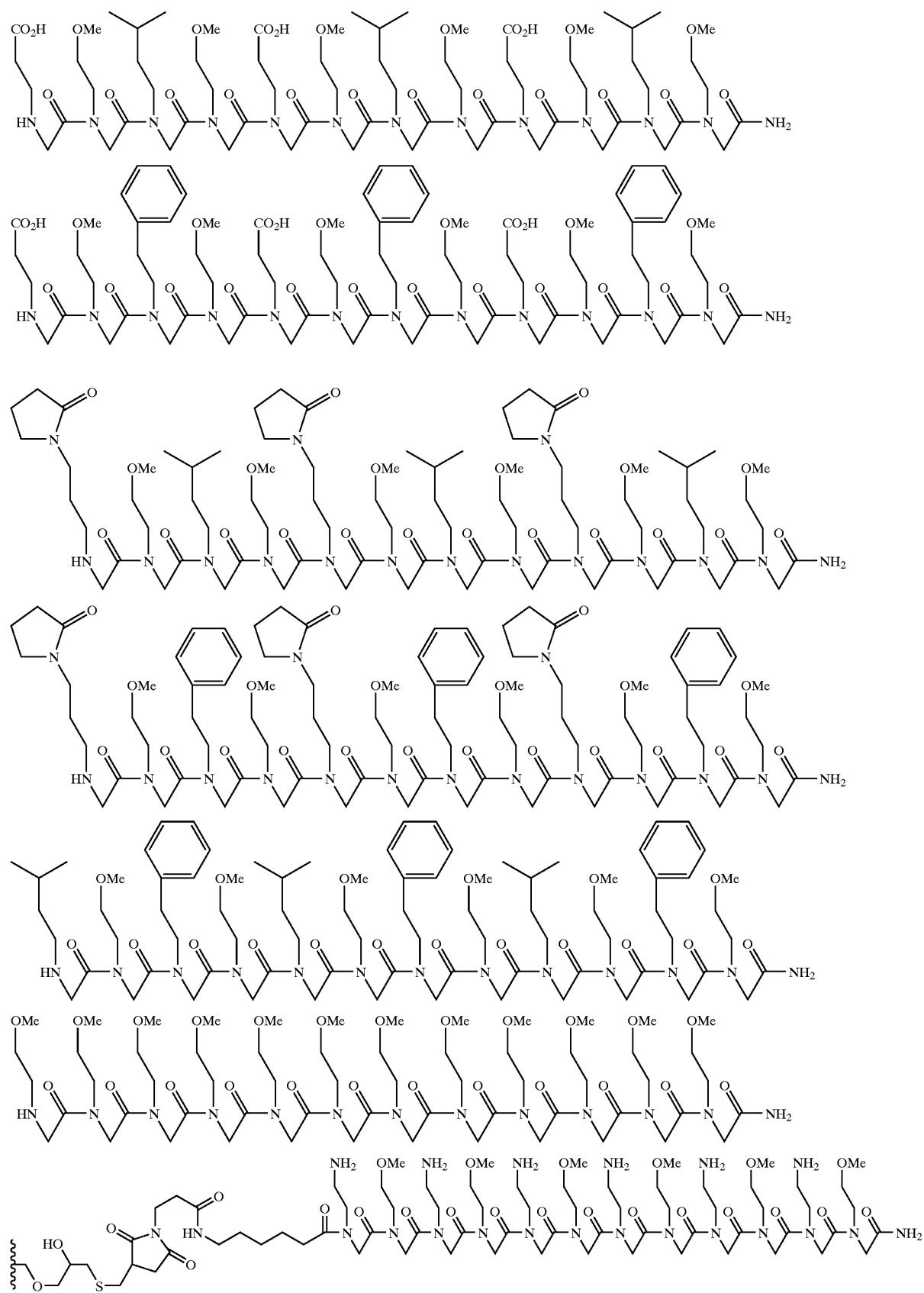

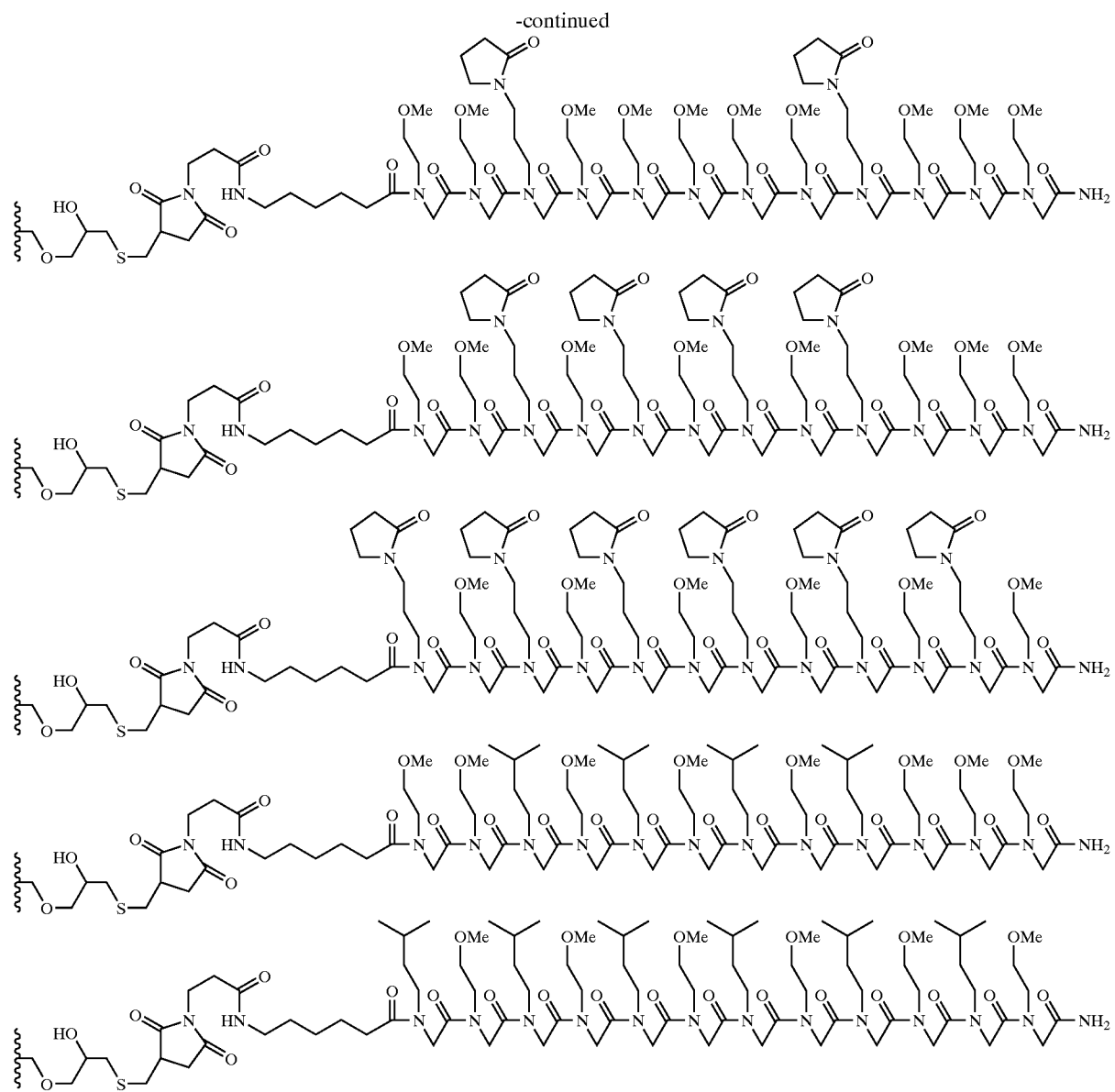
\* \* \* \* \*